(12) United States Patent
Li et al.

(10) Patent No.: US 11,729,843 B2
(45) Date of Patent: Aug. 15, 2023

(54) METHOD AND APPARATUS OF HANDLING DEVICE-TO-DEVICE RESOURCE SELECTION WITH CONSIDERATION ON DISCONTINUOUS RECEPTION OPERATION IN A WIRELESS COMMUNICATION SYSTEM

(71) Applicant: ASUSTek Computer Inc., Taipei (TW)

(72) Inventors: Ming-Che Li, Taipei (TW); Li-Chih Tseng, Taipei (TW); Yi-Hsuan Kung, Taipei (TW); Chun-Wei Huang, Taipei (TW); Li-Te Pan, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 205 days.

(21) Appl. No.: 17/150,550

(22) Filed: Jan. 15, 2021

(65) Prior Publication Data

US 2021/0227602 A1 Jul. 22, 2021

Related U.S. Application Data

(60) Provisional application No. 62/964,033, filed on Jan. 21, 2020.

(51) Int. Cl.
*H04W 76/14* (2018.01)
*H04W 76/28* (2018.01)
(Continued)

(52) U.S. Cl.
CPC .......... *H04W 76/14* (2018.02); *H04L 1/1812* (2013.01); *H04L 5/0091* (2013.01); *H04W 72/02* (2013.01);
(Continued)

(58) Field of Classification Search
CPC . H04W 76/14; H04W 72/02; H04W 72/0446; H04W 76/28; H04W 74/0808;
(Continued)

(56) References Cited

U.S. PATENT DOCUMENTS

2022/0159624 A1* 5/2022 Ko ................... H04W 72/20
2022/0173854 A1* 6/2022 Chae ................ H04L 1/1893
(Continued)

FOREIGN PATENT DOCUMENTS

EP 3780891 2/2021

OTHER PUBLICATIONS

European Search Report from corresponding EP Application No. 21151721.4, dated Jun. 11, 2021.
(Continued)

*Primary Examiner* — Walli Z Butt
(74) *Attorney, Agent, or Firm* — Cooper Legal Group LLC

(57) ABSTRACT

A method and apparatus are disclosed from the perspective of a first device to perform sidelink communication. In one embodiment, the method includes the first device performing sidelink resource selection or reselection procedure for a sidelink transmission to a second device, wherein the sidelink resource selection or reselection procedure is performed to select at least one sidelink resource from candidate sidelink resources within a time duration of selection window. The method further includes the first device selecting a first sidelink resource based on sidelink active time or wake-up time of the second device, wherein the first sidelink resource is within the time duration of selection window. The method also includes the first device performing the sidelink transmission on the first sidelink resource to the second device.

16 Claims, 13 Drawing Sheets

(51) Int. Cl.
*H04L 1/1812* (2023.01)
*H04L 5/00* (2006.01)
*H04W 72/02* (2009.01)
*H04W 72/0446* (2023.01)

(52) U.S. Cl.
CPC ....... *H04W 72/0446* (2013.01); *H04W 76/28* (2018.02)

(58) Field of Classification Search
CPC . H04W 76/23; H04W 72/044; H04W 72/048; H04W 72/1278; H04W 92/18; H04L 1/1812; H04L 5/0091
See application file for complete search history.

(56) References Cited

U.S. PATENT DOCUMENTS

2022/0217738 A1* 7/2022 Lee .................. H04W 72/54
2022/0286255 A1* 9/2022 Guo .................. H04B 7/0626
2022/0295514 A1* 9/2022 Shin ................ H04W 52/0216

OTHER PUBLICATIONS

MCC Support, "Final Report of 3GPP TSG RAN WG1 #98bis v.2.0.0 (Chongqing, China, Oct. 14-20, 2019)", R1-1913275, 3GPP TSG RAN WG1 Meeting #99, Reno, USA, Nov. 18-22, 2019.
Intel, Sony, Huawei, HiSilcon: "WF on Relay Assisted Resource Allocation for FeD2D", 3GPP TSG-RAN WG1 Meeting #90, R1-1714847, Prague, Czech Republic, Aug. 21-25, 2017, 3 pages.
Intel Corporation, ITL: "DRX in Sidelink"; 3GPP TSG RAN WG2#97, R2-1701309, Athens, Greece, Feb. 13-17, 2017, 2 pages.
InterDigital Inc.: "NR Sidelinke Resource Allocation Mechanism for Mode 2"; 3GPP TSG RAN WG1 #96bis, R1-1905402, Xi'an, China, Apr. 8-12, 2019, 6 pages.
Corresponding Korean Patent Application No. 10-2021-0005913, Office Action dated Mar. 22, 2023, English translation, 20 pages.

* cited by examiner

| Resource reservation field in SCI format 1 | Indicated value X | Condition |
|---|---|---|
| '0001', '0010', ...., '1010' | Decimal equivalent of the field | The higher layer decides to keep the resource for the transmission of the next transport block and the value $X$ meets $1 \leq X \leq 10$. |
| '1011' | 0.5 | The higher layer decides to keep the resource for the transmission of the next transport block and the value $X$ is 0.5. |
| '1100' | 0.2 | The higher layer decides to keep the resource for the transmission of the next transport block and the value $X$ is 0.2. |
| '0000' | 0 | The higher layer decides not to keep the resource for the transmission of the next transport block. |
| '1101', '1110', '1111' | Reserved | |

FIG. 5 (PRIOR ART)

| TrCH | Physical Channel |
|---|---|
| SL-SCH | PSSCH |
| SL-BCH | PSBCH |

FIG. 6 (PRIOR ART)

| Control information | Physical Channel |
|---|---|
| $1^{st}$-stage SCI | PSCCH |
| $2^{nd}$-stage SCI | PSSCH |
| SFCI | PSFCH |

FIG. 7 (PRIOR ART)

| DCI format | Usage |
|---|---|
|  |  |
|  |  |
|  |  |
|  |  |
|  |  |
|  |  |
|  |  |
|  |  |
| 3_0 | Scheduling of NR sidelink in one cell |
| 3_1 | Scheduling of LTE sidelink in one cell |

FIG. 8 (PRIOR ART)

METHOD AND APPARATUS OF HANDLING DEVICE-TO-DEVICE RESOURCE SELECTION WITH CONSIDERATION ON DISCONTINUOUS RECEPTION OPERATION IN A WIRELESS COMMUNICATION SYSTEM

CROSS-REFERENCE TO RELATED APPLICATIONS

The present application claims the benefit of U.S. Provisional Patent Application Ser. No. 62/964,033 filed on Jan. 21, 2020, the entire disclosure of which is incorporated herein in their entirety by reference.

FIELD

This disclosure generally relates to wireless communication networks, and more particularly, to a method and apparatus of handling device-to-device resource pool with consideration on discontinuous reception operation in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a first device to perform sidelink communication. In one embodiment, the method includes the first device performing sidelink resource selection or reselection procedure for a sidelink transmission to a second device, wherein the sidelink resource selection or reselection procedure is performed to select at least one sidelink resource from candidate sidelink resources within a time duration of selection window. The method further includes the first device selecting a first sidelink resource based on sidelink active time or wake-up time of the second device, wherein the first sidelink resource is within the time duration of selection window. The method also includes the first device performing the sidelink transmission on the first sidelink resource to the second device.

BRIEF DESCRIPTION OF THE DRAWINGS

FIG. 5 is a reproduction of Table 14.2.1-2 of 3GPP TS 36.213 V15.4.0.

FIG. 6 is a reproduction of Table 4.3-1 of 3GPP R1-1913642.

FIG. 7 is a reproduction of Table 4.3-2 of 3GPP R1-1913642.

FIG. 8 is a reproduction of Table 7.3.1-1 of 3GPP R1-1913642.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 36.213 V15.4.0 (2018-12), "E-UTRA; Physical layer procedures (Release 15)"; R1-1913641, "Introduction of V2X", Ericsson; R1-1913642, "Introduction of 5G V2X sidelink features into TS 38.212", Huawei; R1-1913680, "Introduction of V2X in NR", Samsung; R1-1913643, "Introduction of NR V2X", Nokia; R1-1913644, "Introduction of V2X support", Intel Corporation; R1-1810051, Final Report of 3GPP TSG RAN WG1 #94 v1.0.0 (Gothenburg, Sweden, 20-24 Aug. 2018); Draft Report of 3GPP TSG RAN WG1 #99 v0.1.0 (Reno, USA, 18-22 Nov. 2019); TS 38.321 V15.8.0 (2019-12), "NR; Medium Access Control (MAC) protocol specification (Release 15)"; and RP-193257, "New WID on NR sidelink enhancement", LG Electronics. The standards and documents listed above are hereby expressly incorporated by reference in their entirety.

Figure 1:
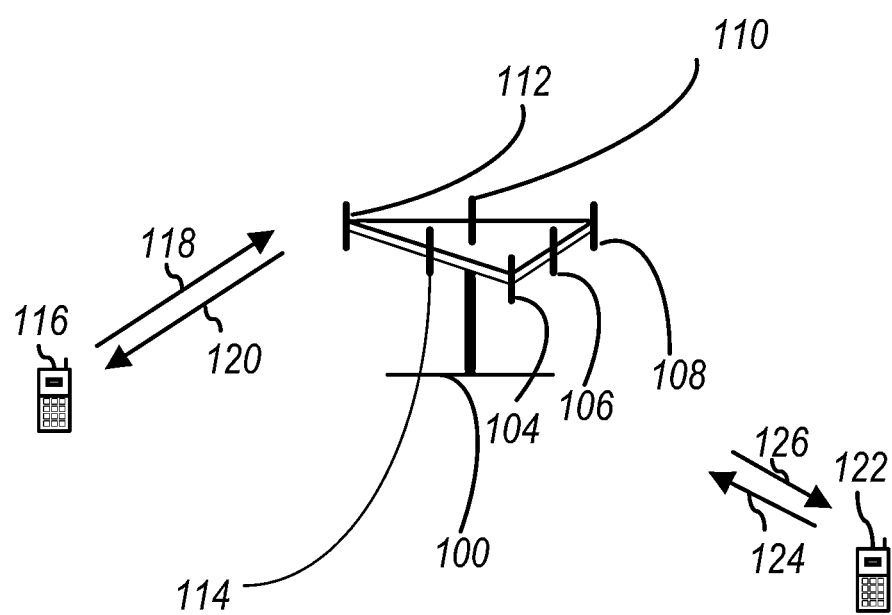
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
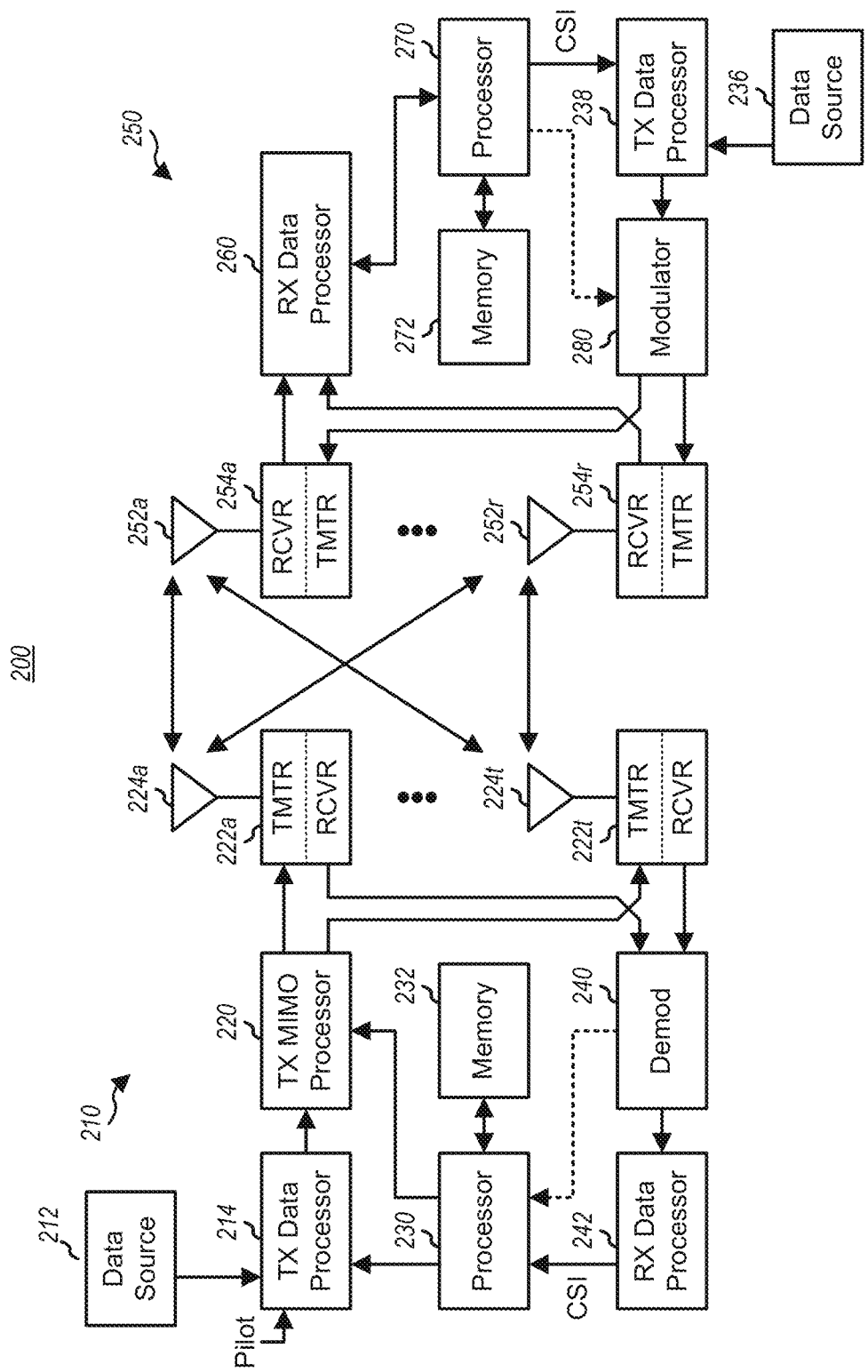
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
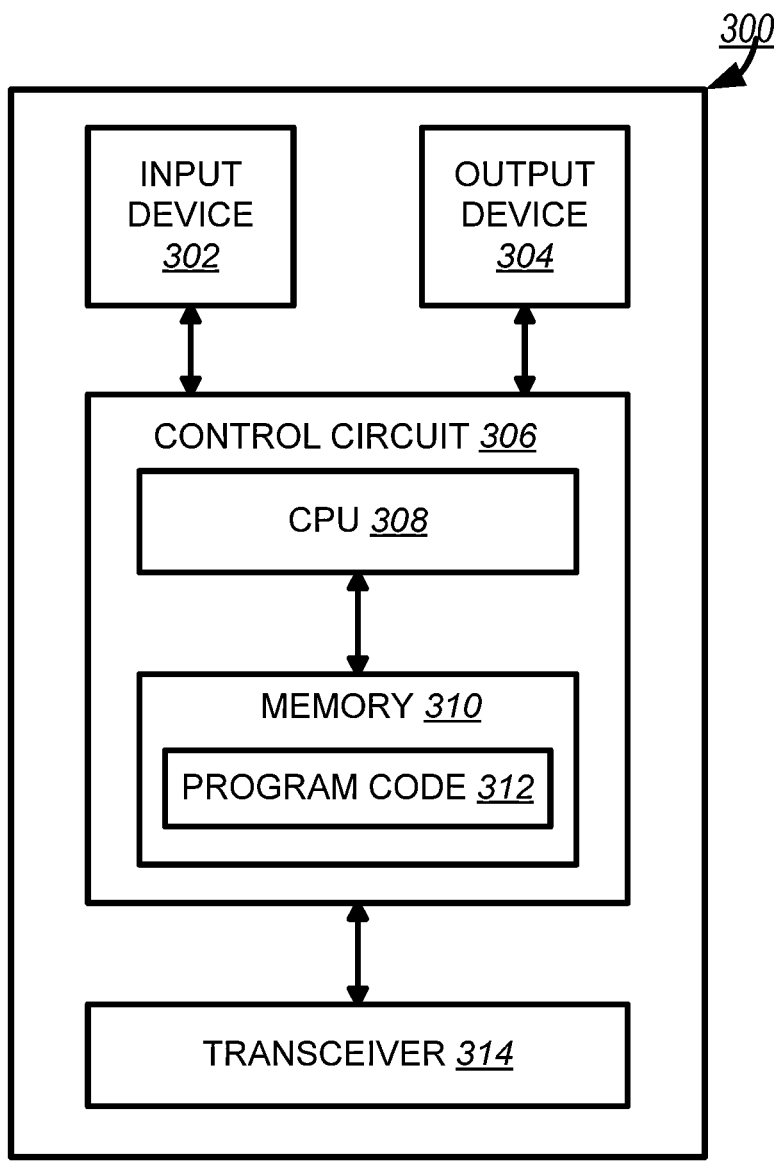
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
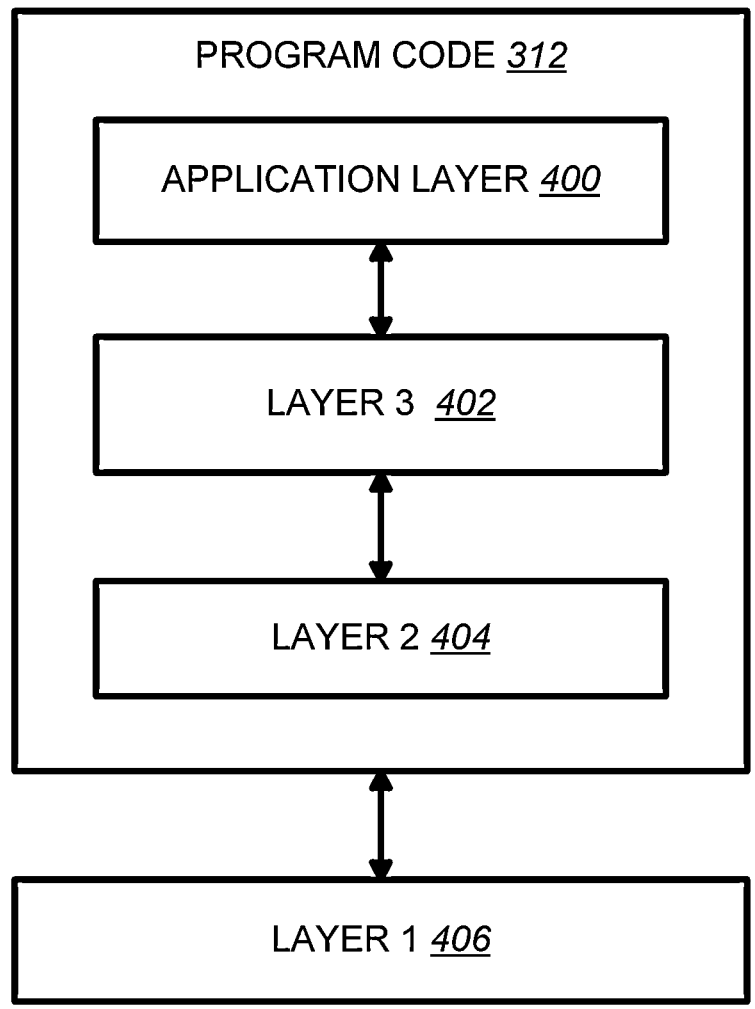
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 36.213 specifies the User Equipment (UE) procedure for Vehicle-to-Everything (V2X) transmission in LTE/LTE-A. The V2X transmissions are performed as sidelink transmission mode 3 or sidelink transmission mode 4 as follows:

14.1.1.6 UE Procedure for Determining the Subset of Resources to be Reported to Higher Layers in PSSCH Resource Selection in Sidelink Transmission Mode 4 and in Sensing Measurement in Sidelink Transmission Mode 3

In sidelink transmission mode 4, when requested by higher layers in subframe n for a carrier, the UE shall determine the set of resources to be reported to higher layers for PSSCH transmission according to the steps described in this Subclause. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers (described in [8]). $C_{resel}$ is determined according to Subclause 14.1.1.4B.

[ . . . ]

If partial sensing is not configured by higher layers then the following steps are used:

1) A candidate single-subframe resource for PSSCH transmission $R_{x,y}$ is defined as a set of $L_{subCH}$ contiguous sub-channels with sub-channel x+j in subframe $t_y^{SL}$ where j=0, . . . , $L_{subCH}$−1. The UE shall assume that any set of $L_{subCH}$ contiguous sub-channels included in the corresponding PSSCH resource pool (described in 14.1.5) within the time interval [n+$T_1$, n+$T_2$] corresponds to one candidate single-subframe resource, where selections of $T_1$ and $T_2$ are up to UE implementations under $T_1 \leq 4$ and $T_{2min}(prio_{TX}) \leq T_2 \leq 100$, if $T_{2min}(prio_{TX})$ is provided by higher layers for $prio_{TX}$, otherwise $20 \leq T_2 \leq 100$. UE selection of $T_2$ shall fulfil the latency requirement. The total number of the candidate single-subframe resources is denoted by $M_{total}$.

2) The UE shall monitor subframes $t_{n'-10 \times P_{step}}^{SL}$, $t_{n'-10 \times P_{step}}^{SL}$, . . . , $t_{n'-1}^{SL}$ except for those in which its transmissions occur, where $t_{n'}^{SL}$=n if subframe n belongs to the set ($t_0^{SL}$, $t_1^{SL}$, . . . , $t_{T_{max}}^{SL}$), otherwise subframe $t_{n'}^{SL}$ is the first subframe after subframe n belonging to the set ($t_0^{SL}$, $t_1^{SL}$, . . . , $t_{T_{max}}^{SL}$). The UE shall perform the behaviour in the following steps based on PSCCH decoded and S-RSSI measured in these subframes.

3) The parameter $Th_{a,b}$ is set to the value indicated by the i-th SL-ThresPSSCH-RSRP field in SL-ThresPSSCH-RSRP-List where i=a*8+b+1.

4) The set $S_A$ is initialized to the union of all the candidate single-subframe resources. The set $S_B$ is initialized to an empty set.

5) The UE shall exclude any candidate single-subframe resource $R_{x,y}$ from the set $S_A$ if it meets all the following conditions:

the UE has not monitored subframe $t_z^{SL}$ in Step 2.
there is an integer j which meets y+j×$P'_{rsvp\_TX}$=z+$P_{step}$×k×q where j=0, 1, . . . , $C_{resel}$−1, $P'_{rsvp\_TX}$=$P_{step}$×$P_{rsvp\_TX}$/100, k is any value allowed by the higher layer parameter restrictResourceReservationPeriod and q=1, 2, . . . , Q. Here, $$Q = \frac{1}{k} \text{ if } k < 1$$

and n'−z≤$P_{step}$×k, where $t_{n'}^{SL}$=n if subframe n belongs to the set $t_0^{SL}$, $t_1^{SL}$, . . . , $t_{T_{max}}^{SL}$, otherwise subframe $t_{n'}^{SL}$ is the first subframe belonging to the set $t_0^{SL}$, $t_1^{SL}$, . . . , $t_{T_{max}}^{SL}$ after subframe n; and Q=1 otherwise.

6) The UE shall exclude any candidate single-subframe resource $R_{x,y}$ from the set $S_A$ if it meets all the following conditions:

the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Subclause 14.2.1.
PSSCH-RSRP measurement according to the received SCI format 1 is higher than $Th_{prio_{TX},prio_{RX}}$.
the SCI format received in subframe $t_m^{SL}$ or the same SCI format 1 which is assumed to be received in subframe(s) $t_{m+q \times P_{step} \times P_{step\_RX}}^{SL}$ determines according to 14.1.1.4C the set of resource blocks and subframes which overlaps with $R_{x,y+j \times P'_{rsvp\_TX}}$ for q=1, 2, . . . , Q and j=0, 1, . . . , $C_{resel}$−1. Here, $$Q = \frac{1}{P_{rsvp\_RX}} \text{ if } P_{rsvp\_RX} < 1 \text{ and } n' - m \leq P_{step} \times P_{rsvp\_RX},$$

if $P_{rsvp\_RX}$<1 and n'−m≤$P_{step}$×$P_{rsvp\_RX}$, where $t_{n'}^{SL}$=n if subframe n belongs to the set ($t_0^{SL}$, $t_1^{SL}$, . . . , $t_{T_{max}}^{SL}$) otherwise subframe $t_{n'}^{SL}$ is the first subframe after subframe n belonging to the set ($t_0^{SL}$, $t_1^{SL}$, . . . , $t_{T_{max}}^{SL}$); otherwise Q=1.

7) If the number of candidate single-subframe resources remaining in the set $S_A$ is smaller than 0.2·$M_{total}$, then Step 4 is repeated with $Th_{a,b}$ increased by 3 dB.

8) For a candidate single-subframe resource $R_{x,y}$ remaining in the set $S_A$, the metric $E_{x,y}$ is defined as the linear average of S-RSSI measured in sub-channels x+k for k=0, . . . , $L_{subCH}$−1 in the monitored subframes in Step 2 that can be expressed by $t_{y-P_{step}*j}^{SL}$ for a non-negative integer j if $P_{rsvp\_TX} \geq 100$, and $t_{y-P'_{rsvp\_TX}*j}^{SL}$ for a non-negative integer j otherwise.

9) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to 0.2·$M_{total}$.

10) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10].

The UE shall report set $S_B$ to higher layers.

If partial sensing is configured by higher layers then the following steps are used:

1) A candidate single-subframe resource for PSSCH transmission $R_{x,y}$ is defined as a set of $L_{subCH}$ contiguous sub-channels with sub-channel x+j in subframe $t_y^{SL}$ where j=0, . . . , $L_{subCH}$−1. The UE shall determine by its implementation a set of subframes which consists of at least Y subframes within the time interval [n+$T_1$, n+$T_2$] where selections of $T_1$ and $T_2$ are up to UE implementations under $T_1 \leq 4$ and $T_{2min}(prio_{TX}) \leq T_2 \leq 100$, if $T_{2min}(prio_{TX})$ is provided by higher layers for $prio_{TX}$, otherwise $20 \leq T_2 \leq 100$. UE selection of $T_2$ shall fulfil the latency requirement and Y shall be greater than or equal to the high layer parameter minNumCandidateSF. The UE shall assume that any set of $L_{subCH}$ contiguous sub-channels included in the corresponding PSSCH resource pool (described in 14.1.5) within the determined set of subframes correspond to one candidate single-subframe resource. The total number of the candidate single-subframe resources is denoted by $M_{total}$.

2) If a subframe $t_y^{SL}$ is included in the set of subframes in Step 1, the UE shall monitor any subframe $t_{y-k \times P_{step}}^{SL}$ if k-th bit of the high layer parameter gapCandidateSensing is set to 1. The UE shall perform the behaviour in the following steps based on PSCCH decoded and S-RSSI measured in these subframes.

3) The parameter $Th_{a,b}$ is set to the value indicated by the i-th SL-ThresPSSCH-RSRP field in SL-ThresPSSCH-RSRP-List where i=a*8+b+1.

4) The set $S_A$ is initialized to the union of all the candidate single-subframe resources. The set $S_8$ is initialized to an empty set.

5) The UE shall exclude any candidate single-subframe resource $R_{x,y}$ from the set $S_A$ if it meets all the following conditions:
   the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Subclause 14.2.1.
   PSSCH-RSRP measurement according to the received SCI format 1 is higher than $Th_{prio_{TX}, prio_{RX}}$.
   the SCI format received in subframe $t_m^{SL}$ or the same SCI format 1 which is assumed to be received in subframe(s) $t_{m+q \times P_{step} \times P_{rspv\_RX}}^{SL}$ determines according to 14.1.1.4C the set of resource blocks and subframes which overlaps with $R_{x,y+j \times P'_{rsvp\_TX}}$ for q=1, 2, . . . , Q and j=0, 1, . . . , $C_{resel}$−1. Here, $$Q = \frac{1}{P_{rsvp\_RX}} \text{ if } P_{rsvp\_RX} < 1$$

and y'−m≤$P_{step} \times P_{rsvp\_RX} \times P_{step}$, where $t_y^{SL}$, is the last subframe of the Y subframes, and Q=1 otherwise.

6) If the number of candidate single-subframe resources remaining in the set $S_A$ is smaller than $0.2 \cdot M_{total}$, then Step 4 is repeated with $Th_{a,b}$ increased by 3 dB.

7) For a candidate single-subframe resource $R_{x,y}$ remaining in the set $S_A$, the metric $E_{x,y}$ is defined as the linear average of S-RSSI measured in sub-channels x+k for k=0, . . . , $L_{subCH}$−1 in the monitored subframes in Step 2 that can be expressed by $t_{y-P_{step}*j}^{SL}$ for a non-negative integer j.

8) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2 \cdot M_{total}$.

9) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10].

The UE shall report set $S_B$ to higher layers.

[ . . . ]

14.2.1 UE Procedure for Transmitting the PSCCH

[ . . . ]

For sidelink transmission mode 4,
The UE shall determine the subframes and resource blocks for transmitting SCI format 1 as follows:
SCI format 1 is transmitted in two physical resource blocks per slot in each subframe where the corresponding PSSCH is transmitted.

If the configured sidelink grant from higher layer indicates the PSCCH resource in subframe $t_n^{SL}$, one transmission of PSCCH is in the indicated PSCCH resource m (described in Subclause 14.2.4) in subframe $t_n^{SL}$.

If "Time gap between initial transmission and retransmission" in the configured sidelink grant (described in [8]) is not equal to zero, another transmission of PSCCH is in the PSCCH resource $L_{ReTX}$ in subframe $t_{n+SF_{gap}}^{SL}$ where $SF_{gap}$ is the value indicated by "Time gap between initial transmission and retransmission" field in the configured sidelink grant, corresponds to the value determined by the procedure in Subclause 14.1.1.4C with the RIV set to the value indicated by "Frequency resource location of the initial transmission and retransmission" field in the configured sidelink grant.

the UE shall set the contents of the SCI format 1 as follows:
the UE shall set the Modulation and coding scheme as indicated by higher layers.
the UE shall set the "Priority" field according to the highest priority among those priority(s) indicated by higher layers corresponding to the transport block.
the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.
the UE shall set the Resource reservation field according to table 14.2.1-2 based on indicated value X, where X is equal to the Resource reservation interval provided by higher layers divided by 100.

Each transmission of SCI format 1 is transmitted in one subframe and two physical resource blocks per slot of the subframe.

[ . . . ]

Table 14.2.1-2 of 3GPP TS 36.213 V15.4.0, Entitled "Determination of the Resource Reservation Field in SCI Format 1", is Reproduced as FIG. 5

The Endorsed CR of TS 38.211 (3GPP R1-1913641) specifies generation for physical sidelink shared channel, physical sidelink control channel, and physical sidelink feedback channel in NR. The physical sidelink shared channel, physical sidelink control channel, and physical sidelink feedback channel are for communication between devices, i.e. PC5 link or device-to-device link. The Physical Sidelink Shared Channel (PSSCH) delivers data or transport blocks for Sidelink Shared Channel (SL-SCH). The Physical Sidelink Control Channel (PSCCH) delivers Sidelink Control Information (SCI). The Physical Sidelink Feedback Channel (PSFCH) delivers sidelink Hybrid Automatic Repeat Request-Acknowledgement (HARQ-ACK).

8 Sidelink 8.1 Overview 8.1.1 Overview of Physical Channels

A sidelink physical channel corresponds to a set of resource elements carrying information originating from higher layers. The following sidelink physical channels are defined:

Physical Sidelink Shared Channel, PSSCH

Physical Sidelink Broadcast Channel, PSBCH

Physical Sidelink Control Channel, PSCCH

Physical Sidelink Feedback Channel, PSFCH 8.1.2 Overview of Physical Signals

A sidelink physical signal corresponds to a set of resource elements used by the physical layer but does not carry information originating from higher layers.

The following sidelink physical signals are defined:

Demodulation reference signals, DM-RS

Channel-state information reference signal, CSI-RS

Phase-tracking reference signals, PT-RS

Sidelink primary synchronization signal, S-PSS

Sidelink secondary synchronization signal, S-SSS

The Endorsed CR of TS 38.212 (3GPP R1-1913642) specifies downlink control information for scheduling of sidelink and sidelink control information in NR. The downlink control information is for communication between network node and UE, i.e. Uu link. The sidelink control information is for communication between UEs, i.e. PC5 link or sidelink.

4.3 Sidelink

Table 4.3-1 specifies the mapping of the sidelink transport channels to their corresponding physical channels. Table 4.3-2 specifies the mapping of the sidelink control information and sidelink feedback control information to their corresponding physical channels.

Table 4.3-1 of 3GPP R1-1913642 is Reproduced as FIG. 6

Table 4.3-2 of 3GPP R1-1913642 is Reproduced as FIG. 7

Unchanged Parts are Omitted 7.3.1 DCI Formats

The DCI formats defined in table 7.3.1-1 are supported.

Table 7.3.1-1 of 3GPP R1-1913642, Entitled "DCI Formats", is Reproduced as FIG. 8

Unchanged Parts are Omitted 8.3 Sidelink Control Information on PSCCH

SCI carried on PSCCH is a $1^{st}$-stage SCI, which transports sidelink scheduling information.

8.3.1 $1^{st}$-Stage SCI Formats

The fields defined in each of the $1^{st}$-stage SCI formats below are mapped to the information bits $a_0$ to $a_{A-1}$ as follows:

[ . . . ]

8.3.1.1 SCI Format 0-1

SCI format 0-1 is used for the scheduling of PSSCH and $2^{nd}$-stage-SCI on PSSCH The following information is transmitted by means of the SCI format 0-1:

Priority—3 bits as defined in subclause x.x.x of [6, TS 38.214].

Frequency resource assignment $$\left\lceil \log_2\left(\frac{N_{subChannel}^{SL}(N_{subChannel}^{SL}+1)}{2}\right) \right\rceil$$

bits when the value of the higher layer parameter maxNumResource is configured to 2; otherwise $$\left\lceil \log_2\left(\frac{N_{subChannel}^{SL}(N_{subChannel}^{SL}+1)(2N_{subChannel}^{SL}+1)}{6}\right) \right\rceil$$

bits when the value of the higher layer parameter maxNumResource is configured to 3, as defined in subclause x.x.x of [6, TS 38.214].

Time resource assignment—5 bits when the value of the higher layer parameter maxNumResource is configured to 2; otherwise 9 bits when the value of the higher layer parameter maxNumResource is configured to 3, as defined in subclause x.x.x of [6, TS 38.214].

Resource reservation period—$\lceil \log_2(N_{reservPeriod}) \rceil$ bits as defined in subclause x.x.x of [6, TS 38.214], if higher parameter reserveResourceDifferentTB is configured; 0 bit otherwise.

DMRS pattern—[x] bits as defined in subclause x.x.x of [6, TS 38.214], if more than one DMRS patterns are configured by higher layer parameter TimePatternPsschDmrs; 0 bit otherwise.

$2^{nd}$-stage SCI format—[x] bits as defined in subclause x.x.x of [6, TS 38.214].

Beta_offset indicator—[2] bits as defined in subclause x.x.x of [6, TS 38.214].

Number of DMRS port—1 bit as defined in subclause x.x.x of [6, TS 38.214].

Modulation and coding scheme—5 bits as defined in subclause x.x.x of [6, TS 38.214].

Reserved—[2-4] bits as determined by higher layer parameter [XXX], with value set to zero.

8.4 Sidelink Control Information on PSSCH

SCI carried on PSSCH is a $2^{nd}$-stage SCI, which transports sidelink scheduling information.

8.4.1 $2^{nd}$-Stage SCI Formats

[ . . . ]

8.4.1.1 SCI Format 0-2

SCI format 0-2 is used for the decoding of PSSCH.

The following information is transmitted by means of the SCI format 0-2:

HARQ Process ID—[x] bits as defined in subclause x.x.x of [6, TS 38.214].

New data indicator—1 bit as defined in subclause x.x.x of [6, TS 38.214].

Redundancy version—2 bits as defined in subclause x.x.x of [6, TS 38.214].

Source ID—8 bits as defined in subclause x.x.x of [6, TS 38.214].

Destination ID—16 bits as defined in subclause x.x.x of [6, TS 38.214].

CSI request—1 bit as defined in subclause x.x.x of [6, TS 38.214].

If the $2^{nd}$-stage SCI format field in the corresponding SCI format 0-1 indicates type 1 groupcast as defined in subclause x.x.x of [6, TS 38.214], the following fields are present:

Zone ID—[x] bits as defined in subclause x.x.x of [6, TS 38.214].

Communication range requirement—[4] bits as defined in subclause x.x.x of [6, TS 38.214]

[ . . . ]

8.4.5 Multiplexing of Coded $2^{nd}$-Stage SCI Bits to PSSCH

The coded $2^{nd}$-stage SCI bits are multiplexed onto PSSCH according to the procedures in Subclause 8.2.1.

The Endorsed CR of TS 38.213 (3GPP R1-1913680) specifies the UE procedure for reporting HARQ-ACK on sidelink and reporting HARQ-ACK on Physical Uplink Control Channel (PUCCH) in NR.

16 UE Procedures for Sidelink

A UE is provided by locationAndBandwidth-SL a BWP for SL transmissions (SL BWP) with numerology and resource grid determined as described in [4, TS38.211]. For a resource pool within the SL BWP, the UE is provided by numSubchannel a number of sub-channels where each sub-channel includes a number of contiguous RBs provided by subchannelsize. The first RB of the first sub-channel in the SL BWP is indicated by startRB-Subchannel. Available slots for a resource pool are provided by timeresourcepool and occur with a periodicity provided by 'periodResourcePool'. For an available slot without S-SS/PBCH blocks, SL transmissions can start from a first symbol indicated by startSL-symbols and be within a number of consecutive symbols indicated by lengthSLsymbols. For an available slot with S-SS/PSBCH blocks, the first symbol and the number of consecutive symbols is predetermined.

The UE expects to use a same numerology in the SL BWP and in an active UL BWP in a same carrier of a same cell. If the active UL BWP numerology is different than the SL BWP numerology, the SL BWP is deactivated.

A UE transmitting using a Mode-1 grant uses the corresponding fields in SCI to reserve the next resource(s) allocated by the same grant.

[ . . . ]

16.4 UE Procedure for Transmitting PSCCH

A UE can be provided a number of symbols in a resource pool, by timeResourcePSCCH, starting from a second symbol that is available for SL transmissions in a slot, and a number of PRBs in the resource pool, by frequencyResourcePSCCH, for a PSCCH transmission with a SCI format 0_1.

The Endorsed CR of TS 38.214 (3GPP R1-1913643) specifies the UE procedure for sidelink shared channel in NR. Sidelink resource allocation mode 1 or sidelink resource allocation mode 2 is utilized for acquiring sidelink resource(s) for sidelink shared channel.

8 Physical Sidelink Shared Channel Related Procedures

A UE can be configured by higher layers with one or more sidelink resource pools. A sidelink resource pool can be for transmission of PSSCH, as described in Subclause 8.1, or for reception of PSSCH, as described in Subclause 8.3 and can be associated with either sidelink resource allocation mode 1 or sidelink resource allocation mode 2.

In the frequency domain, a sidelink resource pool consists of numSubchannel contiguous sub-channels. A sub-channel consists of subchannelsize contiguous PRBs, where numSubchannel and subchannelsize are higher layer parameters.

8.1 UE Procedure for Transmitting the Physical Sidelink Shared Channel

Each PSSCH transmission is associated with an PSCCH transmission.

That PSCCH transmission carries the $1^{st}$ stage of the SCI associated with the PSSCH transmission; the $2^{nd}$ stage of the associated SCI is carried within the resource of the PSSCH.

If the UE transmits SCI format 0-1 on PSCCH according to a PSCCH resource configuration in slot n and PSCCH resource m, then for the associated PSSCH transmission in the same slot one transport block is transmitted with up to two layers;

The number of layers (u) is determined according to the "Number of DMRS port" field in the SCI The set of consecutive symbols within the slot for transmission of the PSSCH is determined according to subclause 8.1.2.1;

The set of contiguous resource blocks for transmission of the PSSCH is determined according to subclause 8.1.2.2;

[ . . . ]

8.1.2 Resource Allocation

In sidelink resource allocation mode 1:

for PSSCH and PSCCH transmission, dynamic grant, configured grant type 1 and configured grant type 2 are supported.

8.1.2.1 Resource Allocation in Time Domain

The UE shall transmit the PSSCH in the same slot as the associated PSCCH.

The minimum resource allocation unit in the time domain is a slot.

The UE shall transmit the PSSCH in consecutive symbols within the slot, subject to the following restrictions:

The UE shall not transmit PSSCH in symbols which are not configured for sidelink. A symbol is configured for sidelink, according to higher layer parameters startSL-symbols and lengthSLsymbols, where startSLsymbols is the symbol index of the first symbol of lengthSLsymbols consecutive symbols configured for sidelink.

Within the slot, PSSCH resource allocation starts at symbol startSLsymbols+1.

The UE shall not transmit PSSCH in symbols which are configured for use by PSFCH, if PSFCH is configured in this slot.

The UE shall not transmit PSSCH in the last symbol configured for sidelink.

The UE shall not transmit PSSCH in the symbol immediately preceding the symbols which are configured for use by PSFCH, if PSFCH is configured in this slot.

[ . . . ]

8.1.2.2 Resource Allocation in Frequency Domain

The resource allocation unit in the frequency domain is the sub-channel.

The sub-channel assignment for sidelink transmission is determined using the "Frequency resource assignment" field in the associated SCI.

The lowest sub-channel for sidelink transmission is the sub-channel on which the lowest PRB of the associated PSCCH is transmitted.

If a PSSCH scheduled by a PSCCH would overlap with resources containing the PSCCH, the resources corresponding to a union of the PSCCH that scheduled the PSSCH and associated PSCCH DM-RS are not available for the PSSCH.

[ . . . ]

8.1.4 UE Procedure for Determining the Subset of Resources to be Reported to Higher Layers in PSSCH Resource Selection in Sidelink Resource Allocation Mode 2

In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:

the resource pool from which the resources are to be reported;
L1 priority, $prio_{TX}$;
the remaining packet delay budget;
the number of sub-channels to be used for the PSSCH/PSCCH transmission in a slot, $L_{subCH}$;
optionally, the resource reservation interval, $P_{rsvp,TX}$, in units of ms.

The following higher layer parameters affect this procedure:

t2min_SelectionWindow: internal parameter $T_{2min}$ is set to the corresponding value from higher layer parameter t2min_SelectionWindow for the given value of $prio_{TX}$.

SL-ThresRSRP_pi_pj: this higher layer parameter provides an RSRP threshold for each combination $(p_i, p_j)$, where $p_j$ is the value of the priority field in a received SCI format 0-1 and $p_j$ is the priority of the transmission of the UE selecting resources; for a given invocation of this procedure, $p_j = prio_{TX}$.

RSforSensing selects if the UE uses the PSSCH-RSRP or PSCCH-RSRP measurement, as defined in subclause 8.4.2.1.

reservationPeriodAllowed t0_SensingWindow: internal parameter $T_0$ is defined as the number of slots corresponding to t0_SensingWindow ms.

The resource reservation interval, $P_{rsvp\_TX}$, if provided, is converted from units of ms to units of logical slots, resulting in $P'_{rsvp\_TX}$.

Notation:

$(t_0^{SL}, t_1^{SL}, t_2^{SL}, \ldots)$ denotes the set of slots which can belong to a sidelink resource pool and is defined in [TBD].

The following steps are used:

1) A candidate single-slot resource for transmission $R_{x,y}$ is defined as a set of $L_{subCH}$ contiguous sub-channels with sub-channel x+j in slot where j=0, . . . , $L_{subCH}$−1. The UE shall assume that any set of contiguous sub-channels included in the corresponding resource pool within the time interval [n+T$_1$, n+T$_2$] correspond to one candidate single-slot resource, where selection of T$_1$ is up to UE implementation under $0 \leq T_1 \leq T_{proc,1}$, where $T_{proc,1}$ is TBD;

If $T_{2min}$ is shorter than the remaining packet delay budget (in slots) then T$_2$ is up to UE implementation subject to $T_{2min} \leq T_2 \leq$ remaining packet budget (in slots); otherwise T$_2$ is set to the remaining packet delay budget (in slots).

The total number of candidate single-slot resources is denoted by $M_{total}$.

2) The sensing window is defined by the range of slots $[n-T_0, n-T_{proc,0})$ where $T_0$ is defined above and $T_{proc,1}$ is TBD. The UE shall monitor slots which can belong to a sidelink resource pool within the sensing window except for those in which its own transmissions occur. The UE shall perform the behaviour in the following steps based on PSCCH decoded and RSRP measured in these slots.

3) The internal parameter $Th(p_i)$ is set to the corresponding value from higher layer parameter SL-ThresRSRP_pi_pj for $p_j$ equal to the given value of $prio_{TX}$ and each priority value $P_i$.

4) The set $S_A$ is initialized to the set of all the candidate single-slot resources.

5) The UE shall exclude any candidate single-slot resource $R_{x,y}$ from the set $S_A$ if it meets all the following conditions:

the UE has not monitored slot $t_m^{SL}$ in Step 2.

for any periodicity value allowed by the higher layer parameter reservationPeriodAllowed and a hypothetical SCI format 0-1 received in slot $t_m^{SL}$ with "Resource reservation period" field set to that periodicity value and indicating all subchannels of the resource pool in this slot, condition c in step 6 would be met.

6) The UE shall exclude any candidate single-slot resource $R_{x,y}$ from the set $S_A$ if it meets all the following conditions:

a. the UE receives an SCI format 0-1 in slot $t_m^{SL}$, and "Resource reservation period" field, if present, and "Priority" field in the received SCI format 0-1 indicate the values $P_{rsvp\_RX}$ and $prio_{RX}$, respectively according to Subclause [TBD] in [6, TS 38.213];

b. the RSRP measurement performed, according to subclause 8.4.2.1 for the received SCI format 0-1, is higher than $Th(prio_{RX})$;

c. the SCI format received in slot $t_m^{SL}$ or the same SCI format which, if and only if the "Resource reservation period" field is present in the received SCI format 0-1, is assumed to be received in slot(s) $t_{m+q \times P'_{rsvp\_RX}}^{SL}$ determines according to subclause [TBD] in [6, TS 38.213] the set of resource blocks and slots which overlaps with $R_{x,y+j \times P'_{rsvp\_TX}}$ for q=1, 2, . . . , Q and j=0, 1, . . . , $C_{resel}$−1. Here, $P'_{rsvp\_RX}$ is $P_{rsvp\_RX}$ converted to units of logical slots, $$Q = \left\lceil \frac{T_{scal}}{P_{rsvp\_RX}} \right\rceil \text{ if } P_{rsvp\_RX} < T_{scal}$$

and n'−m≤$P_{rsvp\_RX}$ where $t_{n'}^{SL}$=n if slot n belongs to the set ($t_0^{SL}$, $t_1^{SL}$, ..., $t_{Tmax}^{SL}$), otherwise slot $t_{n'}^{SL}$ is the first slot after slot n belonging to the set ($t_0^{SL}$, $t_1^{SL}$, ..., $t_{Tmax}^{SL}$); otherwise Q=1. $T_{scal}$ is FFS.

7) If the number of candidate single-slot resources remaining in the set $S_A$ is smaller than 0.2·$M_{total}$, then Th($p_i$) is increased by 3 dB for each priority value Th($p_i$) and the procedure continues with step 4.

The UE shall report set $S_A$ to higher layers.

8.1.5 UE Procedure for Determining Slots and Resource Blocks for PSSCH Transmission Associated with an SCI Format 0-1

The set of slots and resource blocks for PSSCH transmission is determined by the resource used for the PSCCH transmission containing the associated SCI format 0-1, and fields "Frequency resource assignment", "Time resource assignment" of the associated SCI format 1 as described below.

[ ... ]

8.3 UE Procedure for Receiving the Physical Sidelink Shared Channel

For sidelink resource allocation mode 1, a UE upon detection of SCI format 0-1 on PSCCH can decode PSSCH according to the detected SCI format 0-2, and associated PSSCH resource configuration configured by higher layers.

For sidelink resource allocation mode 2, a UE upon detection of SCI format 0-1 on PSCCH can decode PSSCH according to the detected SCI format 0-2, and associated PSSCH resource configuration configured by higher layers.

The Endorsed CR of TS 38.215 (R1-1913644) specifies some measurements for sidelink transmission in NR.

5.1.bb PSSCH Reference Signal Received Power (PSSCH-RSRP)

| | |
|---|---|
| Definition | PSSCH Reference Signal Received Power (PSSCH-RSRP) is defined as the linear average over the power contributions (in [W]) of the resource elements that carry demodulation reference signals associated with physical sidelink shared channel (PSSCH). For frequency range 1, the reference point for the PSSCH-RSRP shall be the antenna connector of the UE. For frequency range 2, PSSCH-RSRP shall be measured based on the combined signal from antenna elements corresponding to a given receiver branch. For frequency range 1 and 2, if receiver diversity is in use by the UE, the reported PSSCH-RSRP value shall not be lower than the corresponding PSSCH-RSRP of any of the individual receiver branches. |
| Applicable for | RRC_IDLE intra-frequency, RRC_IDLE inter-frequency, RRC_CONNECTED inter-frequency |

NOTE 1:
The power per resource element is determined from the energy received during the useful part of the symbol, excluding the CP.

5.1.cc PSCCH Reference Signal Received Power (PSCCH-RSRP)

| | |
|---|---|
| Definition | PSCCH Reference Signal Received Power (PSCCH-RSRP) is defined as the linear average over the power contributions (in [W]) of the resource elements that carry demodulation reference signals associated with physical sidelink control channel (PSCCH). For frequency range 1, the reference point for the PSCCH-RSRP shall be the antenna connector of the UE. For frequency range 2, PSCCH-RSRP shall be measured based on the combined signal from antenna elements corresponding to a given receiver branch. For frequency range 1 and 2, if receiver diversity is in use by the UE, the reported PSCCH-RSRP value shall not be lower than the corresponding PSCCH-RSRP of any of the individual receiver branches. |
| Applicable for | RRC_IDLE intra-frequency, RRC_IDLE inter-frequency, RRC_CONNECTED inter-frequency |

NOTE 1:
The power per resource element is determined from the energy received during the useful part of the symbol, excluding the CP.

5.1.dd Sidelink Received Signal Strength Indicator (SL RSSI)

| | |
|---|---|
| Definition | Sidelink Received Signal Strength Indicator (SL RSSI) is defined as the linear average of the total received power (in [W]) observed in the configured sub-channel in OFDM symbols of a slot configured for PSCCH and PSSCH, starting from the $2^{nd}$ OFDM symbol. For frequency range 1, the reference point for the SL RSSI shall be the antenna connector of the UE. For frequency range 2, SL RSSI shall be measured based on the combined signal from antenna elements corresponding to a given receiver branch. For frequency range 1 and 2, if receiver diversity is in use by the UE, the reported SL RSSI value shall not be lower than the corresponding SL RSSI of any of the individual receiver branches. |
| Applicable for | RRC_IDLE intra-frequency, RRC_IDLE inter-frequency, RRC_CONNECTED intra-frequency, RRC_CONNECTED inter-frequency |

In the RAN1 #94 meeting (as captured in 3GPP R1-1810051), RAN1 has some agreements about NR V2X.

Agreements:
  At least two sidelink resource allocation modes are defined for NR-V2X sidelink communication
  Mode 1: Base station schedules sidelink resource(s) to be used by UE for sidelink transmission(s)
  Mode 2: UE determines (i.e. base station does not schedule) sidelink transmission resource(s) within sidelink resources configured by base station/network or pre-configured sidelink resources In the RAN1 #99 meeting (as captured in the Draft Report of 3GPP TSG RAN WG1 #99 v0.1.0), RAN1 has the following agreements about NR V2X:

Agreements:
  On a per resource pool basis, when reservation of a sidelink resource for an initial transmission of a TB at least by an SCI associated with a different TB is enabled:
    A period is additionally signalled in SCI and the same reservation is applied with respect to resources indicated within $N_{MAX}$ within window W at subsequent periods
    A set of possible period values is the following: 0, [1:99], 100, 200, 300, 400, 500, 600, 700, 800, 900, 1000 ms
    <=4 bits are used in SCI to indicate a period
    An actual set of values is (pre-)configured

R1-1913525

Agreements:
  $T2_{min}$ is (pre-)configured per priority indicated in SCI from the following set of values:
    {1, 5, 10, 20}*$2^\mu$, where μ=0, 1, 2, 3 for SCS 15, 30, 60, 120 respectively Agreements:
  In Step 2, randomized resource selection from the identified candidate resources in the selection window is supported Agreements:
  T0 is (pre)-configured between: 1000+[100] ms and [100] ms
Agreements:
  Support (pre)-configuration per resource pool between:
  L1 SL-RSRP measured on DMRS of PSSCH after decoding of associated $1^{st}$ stage SCI, or
  L1 SL-RSRP measured on DMRS of PSCCH for $1^{st}$ SCI after decoding of associated $1^{st}$ stage SCI
  Note: L1 SL-RSRP is measured only based on one of the above, but not both 3GPP TS 38.321 specifies DRX procedure in NR Uu as follows:

5.7 Discontinuous Reception (DRX)

The MAC entity may be configured by RRC with a DRX functionality that controls the UE's PDCCH monitoring activity for the MAC entity's C-RNTI, CS-RNTI, INT-RNTI, SFI-RNTI, SP-CSI-RNTI, TPC-PUCCH-RNTI, TPC-PUSCH-RNTI, and TPC-SRS-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].

RRC controls DRX operation by configuring the following parameters:
  drx-onDurationTimer: the duration at the beginning of a DRX Cycle;
  drx-SlotOffset: the delay before starting the drx-onDurationTimer;
  drx-InactivityTimer: the duration after the PDCCH occasion in which a PDCCH indicates a new UL or DL transmission for the MAC entity;
  drx-RetransmissionTimerDL (per DL HARQ process except for the broadcast process): the maximum duration until a DL retransmission is received;
  drx-RetransmissionTimerUL (per UL HARQ process): the maximum duration until a grant for UL retransmission is received;
  drx-LongCycleStartOffset: the Long DRX cycle and drx-StartOffset which defines the subframe where the Long and Short DRX Cycle starts;
  drx-ShortCycle (optional): the Short DRX cycle;
  drx-ShortCycleTimer (optional): the duration the UE shall follow the Short DRX cycle;
  drx-HARQ-RTT-TimerDL (per DL HARQ process except for the broadcast process): the minimum duration before a DL assignment for HARQ retransmission is expected by the MAC entity;
  drx-HARQ-RTT-TimerUL (per UL HARQ process): the minimum duration before a UL HARQ retransmission grant is expected by the MAC entity.

When a DRX cycle is configured, the Active Time includes the time while:
  drx-onDurationTimer or drx-InactivityTimer or drx-RetransmissionTimerDL or drx-RetransmissionTimerUL or ra-ContentionResolutionTimer (as described in clause 5.1.5) is running; or
  a Scheduling Request is sent on PUCCH and is pending (as described in clause 5.4.4); or
  a PDCCH indicating a new transmission addressed to the C-RNTI of the MAC entity has not been received after successful reception of a Random Access Response for the Random Access Preamble not selected by the MAC entity among the contention-based Random Access Preamble (as described in clause 5.1.4).

When DRX is configured, the MAC entity shall:
1> if a MAC PDU is received in a configured downlink assignment:
  2> start the drx-HARQ-RTT-TimerDL for the corresponding HARQ process in the first symbol after the end of the corresponding transmission carrying the DL HARQ feedback;
  2> stop the drx-RetransmissionTimerDL for the corresponding HARQ process.
1> if a MAC PDU is transmitted in a configured uplink grant:
  2> start the drx-HARQ-RTT-TimerUL for the corresponding HARQ process in the first symbol after the end of the first repetition of the corresponding PUSCH transmission;
  2> stop the drx-RetransmissionTimerUL for the corresponding HARQ process.
1> if a drx-HARQ-RTT-TimerDL expires:
  2> if the data of the corresponding HARQ process was not successfully decoded:
    3> start the drx-RetransmissionTimerDL for the corresponding HARQ process in the first symbol after the expiry of drx-HARQ-RTT-TimerDL.
1> if a drx-HARQ-RTT-TimerUL expires:
  2> start the drx-RetransmissionTimerUL for the corresponding HARQ process in the first symbol after the expiry of drx-HARQ-RTT-TimerUL.
1> if a DRX Command MAC CE or a Long DRX Command MAC CE is received:
  2> stop drx-onDurationTimer;
  2> stop drx-InactivityTimer.
1> if drx-InactivityTimer expires or a DRX Command MAC CE is received:
  2> if the Short DRX cycle is configured:
    3> start or restart drx-ShortCycleTimer in the first symbol after the expiry of drx-InactivityTimer or in the first symbol after the end of DRX Command MAC CE reception;
    3> use the Short DRX Cycle.
  2> else:
    3> use the Long DRX cycle.
1> if drx-ShortCycleTimer expires:
  2> use the Long DRX cycle.
1> if a Long DRX Command MAC CE is received:
  2> stop drx-ShortCycleTimer,
  2> use the Long DRX cycle.
1> if the Short DRX Cycle is used, and [(SFN×10)+ subframe number] modulo (drx-ShortCycle)=(drx-StartOffset) modulo (drx-ShortCycle), or
1> if the Long DRX Cycle is used, and [(SFN×10)+ subframe number] modulo (drx-LongCycle)=drx-StartOffset:
  2> start drx-onDurationTimer after drx-SlotOffset from the beginning of the subframe.
1> if the MAC entity is in Active Time:
  2> monitor the PDCCH as specified in TS 38.213 [6];
  2> if the PDCCH indicates a DL transmission:
    3> start the drx-HARQ-RTT-TimerDL for the corresponding HARQ process in the first symbol after the end of the corresponding transmission carrying the DL HARQ feedback;
    3> stop the drx-RetransmissionTimerDL for the corresponding HARQ process.

2> if the PDCCH indicates a UL transmission:
   3> start the drx-HARQ-RTT-TimerUL for the corresponding HARQ process in the first symbol after the end of the first repetition of the corresponding PUSCH transmission;
   3> stop the drx-RetransmissionTimerUL for the corresponding HARQ process.
2> if the PDCCH indicates a new transmission (DL or UL):
   3> start or restart drx-InactivityTimer in the first symbol after the end of the PDCCH reception.
1> in current symbol n, if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause:
   2> not transmit periodic SRS and semi-persistent SRS defined in TS 38.214 [7];
   2> not report CSI on PUCCH and semi-persistent CSI configured on PUSCH.
1> if CSI masking (csi-Mask) is setup by upper layers:
   2> in current symbol n, if drx-onDurationTimer would not be running considering grants/assignments/DRX Command MAC CE/Long DRX Command MAC CE received until 4 ms prior to symbol n when evaluating all DRX Active Time conditions as specified in this clause:
      3> not report CSI on PUCCH.
NOTE: If a UE multiplexes a CSI configured on PUCCH with other overlapping UCI(s) according to the procedure specified in TS 38.213 [6] subclause 9.2.5 and this CSI multiplexed with other UCI(s) would be reported on a PUCCH resource outside DRX Active Time, it is up to UE implementation whether to report this CSI multiplexed with other UCI(s).

Regardless of whether the MAC entity is monitoring PDCCH or not, the MAC entity transmits HARQ feedback, aperiodic CSI on PUSCH, and aperiodic SRS defined in TS 38.214 [7] when such is expected.

The MAC entity needs not to monitor the PDCCH if it is not a complete PDCCH occasion (e.g. the Active Time starts or ends in the middle of a PDCCH occasion).

3GPP RP-193257 specifies the Justification and objective of work item on NR V2X as follows:
4.1 Objective of SI or Core Part Wl or Testing Part Wl The objective of this work item is to specify radio solutions that can enhance NR sidelink for the V2X, public safety and commercial use cases.
[ . . . ]
2. Resource allocation enhancement:
  Specify resource allocation to reduce power consumption of the UEs [RAN1, RAN2]
    Baseline is to introduce the principle of Rel-14 LTE sidelink random resource selection and partial sensing to Rel-16 NR sidelink resource allocation mode 2.
    Note: Taking Rel-14 as the baseline does not preclude introducing a new solution to reduce power consumption for the cases where the baseline cannot work properly.
  Study the feasibility and benefit of the enhancement(s) in mode 2 for enhanced reliability and reduced latency in consideration of both PRR and PIR defined in TR37.885 (by RAN #89), and specify the identified solution if deemed feasible and beneficial [RAN1, RAN2]
  Inter-UE coordination with the following until RAN #88.
    A set of resources is determined at UE-A. This set is sent to UE-B in mode 2, and UE-B takes this into account in the resource selection for its own transmission.
3. Sidelink DRX for broadcast, groupcast, and unicast [RAN2]
  Define on- and off-durations in sidelink and specify the corresponding UE procedure
  Specify mechanism aiming to align sidelink DRX wake-up time among the UEs communicating with each other
  Specify mechanism aiming to align sidelink DRX wake-up time with Uu DRX wake-up time in an in-coverage UE One or multiple of following terminologies may be used hereafter:
  BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.
  TRP: A transmission and reception point provides network coverage and directly communicates with UEs. TRP could also be referred to as distributed unit (DU) or network node.
  Cell: A cell is composed of one or multiple associated TRPs, i.e. coverage of the cell is composed of coverage of all associated TRP(s). One cell is controlled by one BS. Cell could also be referred to as TRP group (TRPG).
  NR-PDCCH: A channel carries downlink control signal which is used to control communication between a UE and a network side. A network transmits NR-PDCCH on configured control resource set (CORESET) to the UE.

One or multiple of following assumptions for network side may be used hereafter:
  Downlink timing of TRPs in the same cell are synchronized.
  RRC layer of network side is in BS.
  One or multiple of following assumptions for UE side may be used hereafter:
  There are at least two UE (RRC) states: connected state (or called active state) and non-connected state (or called inactive state or idle state). Inactive state may be an additional state or belong to connected state or non-connected state.

For LTE V2X and/or P2X transmission, there are at least two transmission modes: one transmission mode is scheduled via network, such as sidelink transmission mode 3 (as discussed in 3GPP TS 36.213); and the other transmission mode is sensing-based transmission, such as sidelink transmission mode 4 (as discussed in 3GPP TS 36.213). Since the sensing-based transmission is not scheduled via network, the UE requires performing sensing before selecting a resource for sidelink transmission, in order to avoid resource collision and interference from or to other UEs.

Figure 9:
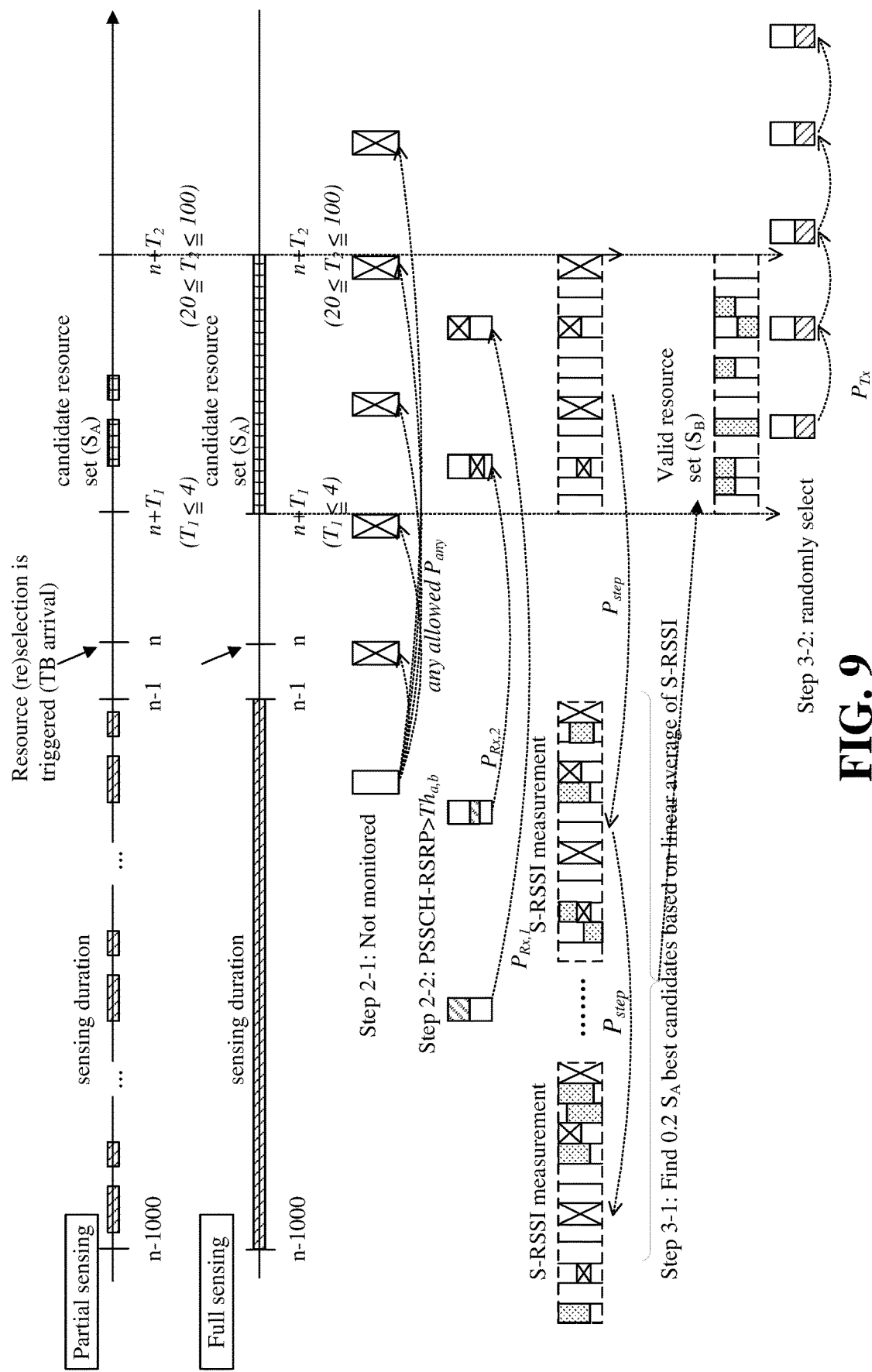
FIG. 9 is a diagram according to one exemplary embodiment.

For the sensing-based resource selection procedure, as an instance shown in FIG. 9, the UE has a candidate resource set comprising multiple candidate resources. The available candidate resource set is restricted with time interval $[n+T_1, n+T_2]$. When partial sensing is configured, the UE determines by its implementation a set of subframes which consists of at least Y subframes within the time interval $[n+T_1, n+T_2]$, wherein the available candidate resource set are in the set of subframes. If full sensing is performed, e.g. partially sensing is not configured, the available candidate resource set are in the (full) time interval $[n+T_1, n+T_2]$. In one embodiment, a candidate resource may mean one candidate single-subframe resource. One candidate resource may comprise one or multiple resource units. The resource unit may be a sub-channel. In one embodiment, the resource unit may comprise multiple (physical) resource blocks in a TTI. The TTI may be a subframe in LTE.

Based on sensing within a sensing duration, the UE may generate/identify a valid resource set, wherein the valid resource set is a subset of the candidate resource set. The generation/identification of the valid resource set may be performed via excluding some candidate resources from the candidate resource set, for instance Step 2-1 and Step 2-2 shown in FIG. 9. The generation/identification of the valid resource set may be performed via selecting/identifying some valid candidate resources, for instance Step 3-1 shown in FIG. 9. And then, the UE selects one or some valid resources from the valid resource set to perform transmission from the UE. The valid resource selection for transmission may be randomly selected from the valid resource set, for instance Step 3-2 shown in FIG. 9.

As discussed in 3GPP TS 36.213, the first excluding step is that if the UE does not monitor or sense a TTI z, the UE cannot expect whether the candidate resources in TTI "$z+F_{any}$" are occupied or not, wherein $P_{any}$ means any possible periodicity for transmission. For instance, the first excluding step is shown as Step 2-1 in FIG. 9. For the case of $P_{any} \geq 100$ ms, the UE excludes the candidate resources in TTI "$z+P_{any}$" and excludes the candidates resources for which the UE may have possible transmission occurred in TTI "$z+P_{any}$". For the case of $P_{any} < 100$ ms, the UE excludes the candidate resources in TTI "$z+q \cdot P_{any}$" and excludes the candidates resources for which the UE may have possible transmission occurred in TTI "$z+q \cdot P_{any}$", wherein q is 1, 2, . . . , $100/P_{any}$. The parameter q means that the UE excludes multiple candidate resources with period $P_{any}$ within time interval $[z, z+100]$. The possible transmission may mean a transmission on a selected valid resource. The possible transmission may mean a periodic transmission of a transmission on a selected valid resource. Moreover, $P_{any}$ means any possible periodicity configured by higher layer.

The second excluding step is that if the UE receives or detects a control signaling in a TTI m, the UE may exclude the candidate resources according to the received control signaling. For instance, the second excluding step is shown as Step 2-2 in FIG. 9. More specifically, if the UE receives or detects a control signaling scheduling a transmission in a TTI m and the measurement result of the scheduled transmission and/or the control signal is over a threshold, the UE may exclude the candidate resources according to the received control signaling. The measurement result may be Reference Signal Received Power (RSRP). More specifically, the measurement result may be PSSCH-RSRP. The control signaling may indicate the resources of the scheduled transmission and/or periodicity of the scheduled transmission, $P_{RX}$.

The excluded candidate resources according to the received control signaling are the resources of next one scheduled transmission based on the resources of the scheduled transmission and periodicity of the scheduled transmission, such as for the case of $P_{RX} \geq 100$ ms. Moreover, the excluded candidate resources according to the received control signaling are the resources of next multiple scheduled transmissions based on the resources of the scheduled transmission and periodicity of the scheduled transmission, such as for the case of $P_{RX} < 100$ ms. The next multiple scheduled transmissions may be with period $P_{RX}$ within time interval $[m, m+100]$. If the control signaling indicates that there is no next scheduled transmission, or the control signaling indicates that the resource of scheduled transmission is not kept in next time, or the control signaling indicates that the scheduled transmission is the last transmission from the UE transmitting the control signaling or the control signaling indicates that the periodicity of the scheduled transmission is indicated as zero, the UE may not exclude candidate resources according to the received control signaling.

After the first excluding step and the second excluding step, the UE may select/identify some valid candidate resources from the remaining candidate resources, such as Step 3-1 shown in FIG. 9. The UE may measure resources in the sensing duration, wherein the measured resources are associated with the remaining candidate resources after Step 2-1 and Step 2-2. More specifically, for a remaining candidate resource, the associated measured resources in the sensing duration are in the occasions with multiple times of a time period from the remaining candidate resources. For instance, if the time period is 100 TTIs, the associated measured resources in the sensing duration are in the TTI "$n-j \cdot 100$", j is positive integer, for a remaining candidate resource in TTI n.

Moreover, the associated measured resources in the sensing duration are with the same frequency resources as the remaining candidate resource. More specifically, the measurement is S-RSSI measurement. Based on the measurement, the UE can derive metric for each remaining candidate resource. The metric for a remaining candidate resource may be linear average of S-RSSI measured from its associated measured resources in the sensing duration. And then, the UE may select valid candidate resources based on the metric of each remaining candidate resource. In one embodiment, an action is that a remaining candidate resource with the smallest metric is selected/identified as valid candidate resource and moved into a valid resource set. Repeating the action until the UE selects/identifies a number of remaining candidate resources as valid candidate resources and moves the number of remaining candidate resources into the valid resource set. For instance, the number is larger than or equal to 20% of total candidate resources. The number is larger than or equal to 20% of cardinality of the candidate resource set.

Based on the current (partially) sensing procedure, the UE can determine/identify the valid resource set. The valid resource set may be reported to higher layers for transmission from the UE. The UE may select one or some valid resources from the valid resource set to perform transmission from the UE. The transmission from the UE may be PSSCH transmission. The transmission from the UE may be sidelink transmission. In one embodiment, the transmission from the UE may be device-to-device transmission.

For NR V2X transmission, there are two sidelink resource allocation modes defined for NR-V2X sidelink communication (as discussed in 3GPP R1-1810051):

In mode 1, the base station or network node can schedule sidelink resource(s) to be used by UE for sidelink transmission(s), which is generally similar as sidelink transmission mode 3 in LTE/LTE-A (as discussed in 3GPP TS 36.213); and In mode 2, the UE determines (i.e. the base station or network node does not schedule) sidelink transmission resource(s) within sidelink resources configured by the base station or network node or pre-configured sidelink resources, which is generally similar as sidelink transmission mode 4 in LTE/LTE-A (as discussed in 3GPP TS 36.213).

For network scheduling mode, the network node may transmit a sidelink (SL) grant on Uu interface for scheduling resources of Physical Sidelink Control Channel (PSCCH) and/or Physical Sidelink Shared Channel (PSSCH). The V2X UE may perform PSCCH and PSSCH transmissions on PC5 interface, in response to the receive sidelink grant. The Uu interface means the wireless interface for communication between network and UE. The PC5 interface means the wireless interface for communication (directly) between UEs or devices.

For UE (autonomous) selection mode, since transmission resource is not scheduled via network, the UE may require performing sensing before selecting a resource for transmission (e.g., sensing-based transmission), in order to avoid resource collision and interference from or to other UEs. Currently, full sensing is supported in NR sidelink. Partial sensing is not supported/designed for NR sidelink. The steps 5 and 6 of non-partial sensing in LTE is applied for sensing procedure (as discussed in the Draft Report of 3GPP TSG RAN WG1 #99 v0.1.0). Based on the result of sensing procedure, the UE can determine a valid resource set. The valid resource set may be reported to higher layers (of the UE). The UE may select one or multiple valid resources from the valid resource set to perform sidelink transmission(s) from the UE. The transmission(s) from the UE may be PSCCH and/or PSSCH transmission.

In the Justification and objective of work item for NR Rel-17 V2X (as discussed in 3GPP RP-193257), power saving is one of enhancement to enable UEs with battery constraint to perform sidelink operations in a power efficient manner. To reduce power consumption, it may specify or design partial sensing to Rel-17 NR sidelink resource allocation mode 2. Thus, a UE may perform partial sensing to select sidelink resources, instead of performing full sensing with more power consumption. Note that the partial sensing and resource selection is performed from transmitter aspect of the UE.

In another aspect, it may specify or design Discontinuous Reception (DRX) for a UE to reduce power consumption, since the UE will not need to wake up all the time. It means that the UE will not need to monitor or decode PSCCH and/or PSSCH in all sidelink slots. In one embodiment, the UE may monitor or decode PSCCH and/or PSSCH in wake-up time or active time. The UE may not monitor or decode PSCCH and/or PSSCH in sleep time or in non-active time.

The DRX procedure in NR Uu may be considered to apply, with some modification, to NR sidelink. In one embodiment, if DRX cycle is introduced for sidelink and/or a DRX on-duration timer for sidelink is introduced, the active time of the UE may include the time while the DRX on-duration timer for sidelink is running. If a DRX Inactivity timer for sidelink is introduced, the active time of the UE may include the time while the DRX Inactivity timer for sidelink is running. If a DRX retransmission timer for sidelink is introduced, the active time of the UE may include the time while the DRX retransmission timer for sidelink is running. In one embodiment, the active time of the UE may include the time while any of the DRX on-duration timer for sidelink, the DRX Inactivity timer for sidelink, or the DRX retransmission timer for sidelink is running. Note that the DRX for sidelink is performed from receiver aspect of the UE.

Although DRX for sidelink is able to reduce power consumption for a UE, it may mean that the UE will not monitor or decode PSCCH in non-active time or sleep time. Accordingly, if any PSCCH and/or PSSCH for the UE occurs in the non-active time or the sleep time, the UE will loss such PSCCH and/or PSSCH. Then, the paired UE transmitting such PSCCH and/or PSSCH will need to perform sidelink retransmission. It will induce impact on resource efficiency and also performance degradation and power consumption of the paired UE. In one embodiment, the link or connection between the UE (configured with DRX for sidelink) and the paired UE may be unicast link. Such the PSCCH and/or the PSSCH may be unicast sidelink transmission. Additionally or alternatively, the link or connection between the UE (configured with DRX for sidelink) and the paired UE may be groupcast link. The UE (configured with DRX for sidelink) and the paired UE are within a same sidelink group. Such PSCCH and/or PSSCH may be groupcast sidelink transmission.

To avoid such impact, some concepts/mechanisms/methods are shown as follows:

Method a

The general concept of Method a is that transmitting device (e.g. a first device) performs restricted resource (re)selection with assumption, expectation, or information on (sidelink) active time of receiving UE (e.g. a second device). In one embodiment, transmitting device may perform restricted resource (re)selection with assumption, expectation, or information on (sidelink) DRX operation of receiving UE.

In one embodiment, when a first device (is triggered or requested to) performs sidelink resource (re-)selection procedure for a sidelink transmission to a second device, the first device could select a first sidelink resource based on (sidelink) active or wake-up time of the second device. In one embodiment, the first device could select a first sidelink resource based on (sidelink) DRX operation of the second device. The first device could select the first sidelink resource from or within a set of candidate slots, wherein the set of candidate slots are determined or derived based on (sidelink) active or wake-up time of the second device. The first device could select the first sidelink resource from or within a set of candidate slots, wherein the set of candidate slots are determined or derived based on (sidelink) DRX operation of the second device. More specifically, the (sidelink) active or wake-up time of the second device could be derived or determined based on (sidelink) DRX operation of the second device. It may mean that the first device assumes or expects that the set of candidate slots is comprised within the (sidelink) active or wake-up time of the second device. It may mean that for selecting the first sidelink resource, the first device may exclude candidate sidelink resources in slots out of the (assumed or expected) (sidelink) active or wake-up time of the second device. For selecting the first sidelink resource, the first device may exclude candidate sidelink resources in slots comprised in the (assumed or expected) (sidelink) non-active or sleep time of the second device.

In one embodiment, the set of candidate slots may be included within a time interval of selection window. The time interval of selection window may start $T_1$ after sidelink resource (re-)selection trigger, and may be bounded by at least $T_2$ and/or a remaining packet delay budget. When the first device is triggered or requested in slot n to determine/identify a valid sidelink resource set for selecting the first sidelink resource, the time interval of selection window may be $[n+T_1, n+T_2]$.

In one embodiment, the set of candidate slots may be included within joint or intersection slots of the time interval of selection window and the (assumed or expected) (sidelink) active or wake-up time of the second device. In one embodiment, the derivation or determination of the time interval of selection window may be independent or separate from the (assumed or expected) (sidelink) active or wake-up time of the second device.

In one embodiment, $T_1$ may be selected by the first device implementation under $0 \leq T_1 \leq T_{proc,1} \cdot T_{proc,1}$ may comprise the allowable maximum processing time for performing resource reselection and/or for generating the sidelink transmission. Additionally or alternatively, $T_1$ may be selected by the first device implementation under $T^{proc,1} \leq T_1 \leq T_{proc,1}$. Additionally or alternatively, $T_1$ may be selected by the first device implementation under $T_{proc,1} \leq T_1$. $T_{proc,1}$ may comprise resource reselection processing time and/or processing time for generating the sidelink transmission. $T_{proc,1'}$ could be equal to 4. $T_{proc,1'}$ could be (pre-)configured per UE or device and/or (pre-)configured for a pedestrian UE.

In one embodiment, $T_2$ could be set to the remaining packet delay budget, when the remaining packet delay budget is shorter than a configured parameter $T_{2min}$. $T_2$ could be set by the first device implementation subject to $T_{2min} \leq T_2 \leq$ remaining packet delay budget, when the remaining packet delay budget is larger than a configured parameter $T_{2min}$.

Additionally or alternatively, the time interval of selection window could be derived or determined by the (assumed or expected) (sidelink) active or wake-up time of the second device. In one embodiment, the set of candidate slots may be (full) slots of the time interval of selection window.

In one embodiment, $T_1$ could be selected by the first device implementation under $t_{active\_start} \leq n+T_1 \leq n+T_{proc,1}$, if $T_{active\_start} \leq n+T_{proc,1}$ and/or $T_{active\_start} \leq n+T_1$ if $n+T_{proc,1} \leq T_{active\_start} - T_{proc,1}$ may comprise the allowable maximum processing time for performing resource reselection and/or for generating the sidelink transmission. $T_{active\_start}$ could be the first slot of the (sidelink) active or wake-up time of the second device after sidelink resource (re-)selection trigger or after the slot n. Additionally or alternatively, $T_1$ could be selected by the first device implementation Under $T_{proc,1} \leq T_1 \leq T_{proc,1}$, if $T_{active\_start} \leq n+T_{proc,1}$, $T_{active\_start} \leq n+T_1 \leq n+T_{proc,1}$, if $n+T_{proc,1} \leq T_{active\_start} \leq n+T_{proc,1'}$, and/or $T_{active\_start} \leq n+T_1$ if $n+T_{proc,1'} \leq T_{active\_start}$. $T_{proc,1}$ may comprise resource reselection processing time and/or processing time for generating the sidelink transmission. $T_{proc,1}$ could be equal to 4. $T_{proc,1}$ could be (pre-Configured per UE or device and/or (pre-Configured for a pedestrian UE. In one embodiment, $T_{active\_start}$ could be the first slot of the (sidelink) active or wake-up time of the second device after sidelink resource (re-)selection trigger or after the slot n.

In one embodiment, if $n+T_{2min} \leq T_{active\_last}$, $T_2$ could be set to the remaining packet delay budget, when the remaining packet delay budget is shorter than a configured parameter $T_{2min}$. If $n+T_{2min} \leq T_{active\_last}$, $T_2$ could be set by the first device implementation subject to $n+T_{2min} \leq n+T_2 \leq \min\{T_{active\_last}, n+$remaining packet delay budget$\}$, when the remaining packet delay budget is larger than a configured parameter $T_{2min}$. If $T_{active\_last} \leq n+T_{2min}$, $n+T_2$ could be set to $\min\{T_{active\_last}, n+$remaining packet delay budget$\}$, when the remaining packet delay budget is shorter than a configured parameter $T_{2min}$. If $T_{active\_last} \leq n+T_{2min}$, $T_2$ could be set by the first device implementation subject to $T_{active\_last}$, when the remaining packet delay budget is larger than a configured parameter $T_{2min}$. In one embodiment, $T_{active\_last}$ could be the last slot of the (last) (sidelink) active or wake-up time of the second device, wherein the (last) (sidelink) active or wake-up time comprises any slot after sidelink resource (re-)selection trigger or after the slot n, and wherein the (last) (sidelink) active or wake-up time comprises any slot before $n+T_{2min}$ or before n+remaining packet delay budget.

In one embodiment, the resource (re-)selection could be triggered or requested by the higher layer (of the first device). The valid sidelink resource set could be derived or determined, or identified from the candidate sidelink resources in the set of the candidate slots. The first device may derive or determine or identify the valid sidelink resource set, from the candidate sidelink resources in the set of the candidate slots, based on sensing result. In one embodiment, the first device could select the first sidelink resource from the valid sidelink resource set. The first device could report the valid sidelink resource set to the higher layer (of the first device). The higher layer (of the first device) could select the first sidelink resource from the valid sidelink resource set.

In one embodiment, the first device may know (sidelink) DRX-related parameters), PSCCH-monitoring-related parameter(s), or assisted parameter(s) of the second device. In one embodiment, the first device may know, assume, or expect (sidelink) DRX operation of the second device, based on the (sidelink) DRX-related parameter(s), PSCCH-monitoring-related parameter(s), or assisted parameters) of the second device. Furthermore, the first device may know, assume, or expect the (sidelink) active or wake-up time of the second device, based on the (sidelink) DRX-related parameters), PSCCH-monitoring-related parameters), or assisted parameters) of the second device. In addition, the first device may know, assume, or expect the (sidelink) non-active or sleep time of the second device, based on the (sidelink) DRX-related parameters), PSCCH-monitoring-related parameters), or assisted parameters) of the second device. In one embodiment, the second device may transmit or deliver the DRX-related parameters), PSCCH-monitoring-related parameters), or assisted parameters) of the second device to the first device.

In one embodiment, the first device may maintain or utilize DRX-related parameters), PSCCH-monitoring-related parameters), or assisted timers) for sidelink resource (re)selection. The DRX-related parameters), PSCCH-monitoring-related parameters), or assisted timers) for sidelink resource (re)selection may be set or determined based on the (sidelink) DRX-related parameters), PSCCH-monitoring-related parameters), or assisted parameters) of the second device. The DRX-related parameters), PSCCH-monitoring-related parameters), or assisted timers) for sidelink resource (re)selection could be utilized for the first device to assume or expect the (sidelink) active or wake-up time of the second device. The first device may derive or determine the set of candidate slots based on DRX-related parameters), PSCCH-monitoring-related parameter(s), or assisted timer(s) for sidelink resource (re)selection. In one embodiment, the second device may transmit or deliver the DRX-related parameter(s), PSCCH-monitoring-related parameter(s), or assisted parameter(s) of the second device to the first device.

In one embodiment, the first device may not be configured with (sidelink) DRX operation. Additionally or alternatively, the first device may be configured with (sidelink) DRX operation, and the first device may not share, have, or configure the same (sidelink) DRX-related parameter(s), PSCCH-monitoring-related parameters), or assisted parameters of the second device. Additionally or alternatively, if the first device is configured with (sidelink) DRX operation, the first device may share, have, or configure the same (sidelink) DRX-related parameters), PSCCH-monitoring-related parameters), or assisted parameters) of the second device.

In one embodiment, the first device may know, assume, or expect (sidelink) DRX operation of the second device, based on the (sidelink) DRX-related parameters), PSCCH-monitoring-related parameters), or assisted parameters) of the first device. In one embodiment, the first device may know, assume, or expect the (sidelink) active or wake-up time of the second device, based on the (sidelink) DRX-related parameters), PSCCH-monitoring-related parameters), or assisted parameters) of the first device. The first device may know, assume, or expect the (sidelink) non-active or sleep time of the second device, based on the (sidelink) DRX-related parameters), PSCCH-monitoring-related parameters), or assisted parameters) of the first device.

Further discussion about the (sidelink) DRX-related parameters), PSCCH-monitoring-related parameters), or assisted parameters) is provided below. Any of the bullets below may be combined or applied simultaneously.

In one embodiment, the (sidelink) DRX-related parameters), PSCCH-monitoring-related parameters), or assisted parameters) may comprise parameters) about (sidelink) DRX cycle. The (sidelink) DRX-related parameters), PSCCH-monitoring-related parameters), or assisted parameters) may comprise (time length of) a DRX on-duration timer (for sidelink) and/or a DRX slot offset (for sidelink).

In one embodiment, the first device may maintain or utilize a DRX on-duration timer for sidelink resource (re)selection. The DRX on-duration timer for sidelink resource (re)selection could be set or determined based on (time length of) the DRX on-duration timer (for sidelink) of the second device. The DRX on-duration timer for sidelink resource (re)selection could be utilized for the first device to assume or expect the (sidelink) active or wake-up time of the second device.

In one embodiment, the first device may maintain or utilize a DRX slot offset for sidelink resource (re)selection. The DRX slot offset for sidelink resource (re)selection could be set or determined based on DRX slot offset (for sidelink) of the second device. The DRX slot offset for sidelink resource (re)selection could be utilized for the first device to assume or expect the (sidelink) active or wake-up time of the second device.

In one embodiment, the first device may derive or determine the set of candidate slots based on the DRX on-duration timer (for sidelink) and/or the DRX slot offset (for sidelink). The active or wake-up time may include the time while the DRX on-duration timer (for sidelink) is running. The first device may derive or determine the set of candidate slots based on the DRX on-duration timer for sidelink resource (re)selection and/or the DRX slot offset for sidelink resource (re)selection. The active or wake-up time may include the time while the DRX on-duration timer for sidelink resource (re)selection is running.

In one embodiment, the (sidelink) DRX-related parameters), PSCCH-monitoring-related parameter(s), or assisted parameters) may comprise (time length of) a DRX Inactivity timer (for sidelink). The first device may maintain or utilize a DRX Inactivity timer for sidelink resource (re)selection. The DRX Inactivity timer for sidelink resource (re)selection could be set or determined based on (time length of) the DRX Inactivity timer (for sidelink) of the second device. The DRX on-duration timer for sidelink resource (re)selection could be utilized for the first device to assume or expect the (sidelink) active or wake-up time of the second device.

In one embodiment, the first device may derive or determine the set of candidate slots based on DRX Inactivity timer (for sidelink). The active or wake-up time may include the time while the DRX Inactivity timer (for sidelink) is running. The first device may derive or determine the set of candidate slots based on the DRX Inactivity timer for sidelink resource (re)selection. The active or wake-up time may include the time while the DRX Inactivity timer for sidelink resource (re)selection is running.

In one embodiment, the first device may know, assume, or expect that the DRX Inactivity timer (for sidelink) of the second device starts or restarts, in response to the first device transmits a PSCCH (initial or new) transmission to the second device. The first device may assume or expect that the DRX Inactivity timer (for sidelink) of the second device starts or restarts, without checking SL HARQ-ACK feedback, which is associated with the (initial or new) PSCCH or associated with a PSSCH (initial or new) transmission scheduled by the (initial or new) PSCCH. The first device may assume or expect that the DRX Inactivity timer (for sidelink) of the second device starts or restarts, no matter the detected SL HARQ-ACK feedback, which is associated with the (initial or new) PSCCH or associated with a PSSCH (initial or new) transmission scheduled by the (initial or new) PSCCH, is ACK or NACK or DTX.

In one embodiment, the first device may start or restart the DRX Inactivity timer for sidelink resource (re)selection, in response to the first device transmits a PSCCH (initial or new) transmission to the second device. The first device may start or restart the DRX Inactivity timer for sidelink resource (re)selection without checking SL HARQ-ACK feedback, which is associated with the (initial or new) PSCCH or associated with a PSSCH (initial or new) transmission scheduled by the (initial or new) PSCCH. The first device may start or restart the DRX Inactivity timer for sidelink resource (re)selection no matter the detected SL HARQ-ACK feedback, which is associated with the (initial or new) PSCCH or associated with a PSSCH (initial or new) transmission scheduled by the (initial or new) PSCCH, is ACK or NACK or DTX.

Additionally or alternatively, the first device may know, assume, or expect that the DRX Inactivity timer (for sidelink) of the second device starts or restarts, in response to the second device receives a PSCCH (initial or new) transmission from the first device. Preferably, the first device may start or restart the DRX Inactivity timer for sidelink resource (re)selection, in response to the second device receives a PSCCH (initial or new) transmission from the first device.

In one embodiment, the first device may know, assume, or expect that the second device have received the (initial or new) PSCCH transmission from the first device, based on detecting SL HARQ-ACK feedback associated with the (initial or new) PSCCH or associated with a PSSCH (initial or new) transmission scheduled by the (initial or new) PSCCH. The PSSCH (initial or new) transmission and the PSCCH (initial or new) transmission could be performed, transmitted, or received in the same slot. The (initial or new) PSCCH may mean that the PSCCH indicates or schedules a new PSSCH transmission. The (initial or new) PSSCH may mean that the PSSCH delivers a new data packet (at first time). The SL HARQ-ACK feedback may be ACK or NACK. Preferably, the first device may know, assume, or expect that the second device does not receive the PSCCH (initial) transmission from the first device, based on detecting DTX or not detecting SL HARQ-ACK feedback associated with the PSCCH.

Additionally or alternatively, the (sidelink) DRX-related parameters), PSCCH-monitoring-related parameters), or assisted parameters) may not comprise a DRX Inactivity timer (for sidelink). The first device may derive or determine the set of candidate slots without basing on DRX Inactivity timer (for sidelink).

In one embodiment, the (sidelink) DRX-related parameters), PSCCH-monitoring-related parameters), or assisted parameters) may comprise (time length of) a DRX retransmission timer (for sidelink). The first device may maintain or utilize a DRX retransmission timer for sidelink resource (re)selection. The DRX retransmission timer for sidelink resource (re)selection may be set or determined based on (time length of) the DRX retransmission timer (for sidelink) of the second device. The DRX retransmission timer for sidelink resource (re)selection may be utilized for the first device to assume or expect the (sidelink) active or wake-up time of the second device.

In one embodiment, the first device may derive or determine the set of candidate slots based on DRX retransmission timer (for sidelink). The active or wake-up time may include the time while the DRX retransmission timer (for sidelink) is running. The first device may derive or determine the set of candidate slots based on the DRX retransmission timer for sidelink resource (re)selection. The active or wake-up time may include the time while the DRX retransmission timer for sidelink resource (re)selection is running.

In one embodiment, the first device may perform a PSCCH or PSSCH transmission to the second device. The first device may detect or receive SL HARQ-ACK feedback associated with the PSCCH or PSSCH transmission from the second device. The first device may know, assume, or expect that the DRX retransmission timer (for sidelink) of the second device starts or restarts, when the first device detects associated SL HARQ-ACK feedback as NACK from the second device. The first device may start or restart the DRX retransmission timer for sidelink resource (re)selection, when the first device detects associated SL HARQ-ACK feedback as NACK from the second device. The PSCCH or PSSCH transmission may be the last reserved PSCCH or PSSCH transmission for a same data packet before performing the sidelink resource reselection. The first device may know, assume, or expect that the DRX retransmission timer (for sidelink) of the second device does not start or restart, when the first device detects associated SL HARQ-ACK feedback as ACK from the second device or the first device does not detect associated SL HARQ-ACK feedback from the second device. The first device may not start or restart the DRX retransmission timer for sidelink resource (re)selection, when the first device detects associated SL HARQ-ACK feedback as ACK from the second device or the first device does not detect associated SL HARQ-ACK feedback from the second device.

In one embodiment, the DRX retransmission timer (for sidelink) of the second device may start or restart after a time duration from the (slot) time of the SL HARQ-ACK feedback. The DRX retransmission timer for sidelink resource (re)selection may start or restart after a time duration from the (slot) time of the SL HARQ-ACK feedback. The time duration may mean a DRX HARQ RTT (Round Trip Time) time for sidelink. The second device may (re-)start the DRX HARQ RTT timer in response to transmission of the SL HARQ-ACK feedback. Preferably, the first device may (re-)start the DRX HARQ RTT timer in response to reception of the SL HARQ-ACK feedback. The PSCCH or PSSCH transmission may be the last reserved PSCCH/ PSSCH transmission for a same data packet before performing the sidelink resource reselection. Preferably, the second device may start or restart the DRX retransmission timer (for sidelink) when the DRX HARQ RTT timer expires. Preferably, the first device may start or restart the DRX retransmission timer for sidelink resource (re)selection when the DRX HARQ RTT timer expires.

Additionally or alternatively, the DRX retransmission timer (for sidelink) of the second device may start or restart after a time duration from receiving the PSCCH or PSSCH (from the first device). The DRX retransmission timer for sidelink resource (re)selection may start or restart after a time duration from transmitting the PSCCH or PSSCH (from the first device). The time duration may mean a DRX HARQ RTT time for sidelink. Preferably, the second device may (re-)start the DRX HARQ RTT timer in response to receiving the PSCCH or PSSCH. The first device may (re-)start the DRX HARQ RTT timer in response to transmitting the PSCCH or PSSCH. The PSCCH or PSSCH transmission may be the last reserved PSCCH or PSSCH transmission for a same data packet before performing the sidelink resource reselection. The second device may start or restart the DRX retransmission timer (for sidelink) when the DRX HARQ RTT timer expires. The first device may start or restart the DRX retransmission timer for sidelink resource (re)selection when the DRX HARQ RTT timer expires.

In one embodiment, the first device may know, assume, or expect that (re)starting time of the DRX retransmission timer (for sidelink) of the second device with consideration of the DRX HARQ RTT time or timer.

Additionally or alternatively, the (sidelink) DRX-related parameters), PSCCH-monitoring-related parameters), or assisted parameters) may not comprise a DRX retransmission timer (for sidelink). The first device may derive or determine the set of candidate slots without basing on DRX retransmission timer (for sidelink).

In one embodiment, the first device may know, assume, or expect the (sidelink) active or wake-up time of the second device while (knowing, assuming, or expecting) any of the DRX on-duration timer (for sidelink), DRX Inactivity timer (for sidelink), or DRX retransmission timer (for sidelink) is running. Furthermore, the first device may know, assume, or expect the (sidelink) active or wake-up time of the second device while any of the DRX on-duration timer for sidelink resource (re)selection, DRX Inactivity timer for sidelink resource (re)selection, or DRX retransmission timer for sidelink resource (re)selection is running.

In one embodiment, for a time or slot while the first device does not know, assume, or expect the (sidelink) active or wake-up time of the second device, the first device may know, assume, or expect the time or slot as the (sidelink) non-active or sleep time of the second device. The first device may know, assume, or expect the (sidelink) non-active or sleep time of the second device while (knowing, assuming, or expecting) none of the DRX on-duration timer (for sidelink), DRX Inactivity timer (for sidelink), and DRX retransmission timer (for sidelink) is running.

In one embodiment, the second device may not monitor or decode PSCCH and/or PSSCH (at least from the first device) in non-active or sleep time. The second device may monitor or decode PSCCH and/or PSSCH (at least from the first device) in active or wake-up time.

In one embodiment, the first sidelink resource may be selected for a PSCCH initial or new transmission. Furthermore, the first sidelink resource may be selected for a PSSCH initial/new transmission scheduled by the initial or new PSCCH.

In one embodiment, the sidelink transmission, from the first device to the second device, may be an initial or new PSCCH transmission. Furthermore, the sidelink transmission, from the first device to the second device, may be an initial or new PSSCH transmission scheduled by the initial or new PSCCH. In one embodiment, the initial or new PSSCH transmission and the initial or new PSCCH transmission are performed, transmitted, or received in the same slot. The initial or new PSCCH may mean that the PSCCH indicates or schedules a new PSSCH transmission. The initial or new PSSCH may also mean that the PSSCH delivers a new data packet (at first time).

In one embodiment, the first sidelink resource may be selected for a PSCCH retransmission (based on detecting HARQ-ACK feedback as NACK or DTX). Furthermore, the first sidelink resource may be selected for a PSSCH retransmission (based on detecting HARQ-ACK feedback as NACK or DTX).

In one embodiment, the sidelink transmission, from the first device to the second device, may be a PSCCH retransmission (based on detecting HARQ-ACK feedback as NACK or DTX). Furthermore, the sidelink transmission, from the first device to the second device, may be a PSSCH retransmission (based on detecting HARQ-ACK feedback as NACK or DTX). The PSCCH retransmission may mean that the PSCCH indicates or schedules an associated PSSCH retransmission. The PSCCH retransmission and the associated PSSCH retransmission may be performed, transmitted, or received in the same slot. Also, the PSSCH retransmission may mean that the PSSCH delivers a data packet, which has been transmitted or delivered at least one time.

Additionally or alternatively, the first sidelink resource may not be selected for a PSCCH retransmission (based on detecting HARQ-ACK feedback as NACK). The first sidelink resource may not be selected for a PSSCH retransmission based on detecting HARQ-ACK feedback as NACK. The first device may select, determine, or acquire a second sidelink resource for PSCCH retransmission and/or PSSCH retransmission (to the second device) without basing on (sidelink) DRX operation of the second device. The first device may also select, determine, or acquire a second sidelink resource for PSCCH retransmission and/or PSSCH retransmission (to the second device) without basing on (sidelink) active or wake-up time of the second device.

In one embodiment, when the first sidelink resource is selected for an initial or new PSCCH transmission and/or an initial or new PSSCH transmission, the first device may select the first sidelink resource based on (sidelink) DRX operation associated with any of DRX on-duration timer (for sidelink), a DRX slot offset (for sidelink), DRX Inactivity timer (for sidelink), and/or DRX retransmission timer (for sidelink) of the second device.

In one embodiment, when the first sidelink resource is selected for delivering a new data packet (at first time), the first device may select the first sidelink resource based on (sidelink) DRX operation associated with any of DRX on-duration timer (for sidelink), a DRX slot offset (for sidelink), DRX Inactivity timer (for sidelink), and/or DRX retransmission timer (for sidelink) of the second device.

In one embodiment, when the first sidelink resource is selected for a PSCCH retransmission and/or a PSSCH retransmission (based on detecting HARQ-ACK feedback as NACK or DTX), the first device may select the first sidelink resource based on (sidelink) DRX operation associated with any of DRX on-duration timer (for sidelink), a DRX slot offset (for sidelink), DRX Inactivity timer (for sidelink), and/or DRX retransmission timer (for sidelink) of the second device.

In one embodiment, when the first sidelink resource is selected for delivering a data packet, which has been transmitted or delivered at least one time, (based on detecting HARQ-ACK feedback as NACK or DTX), the first device may select the first sidelink resource based on (sidelink) DRX operation associated with any of DRX on-duration timer (for sidelink), a DRX slot offset (for sidelink), DRX Inactivity timer (for sidelink), and/or DRX retransmission timer (for sidelink) of the second device.

In one embodiment, when the first sidelink resource is selected for an initial or new PSCCH transmission and/or an initial or new PSSCH transmission, the first device may select the first sidelink resource based on (sidelink) DRX operation associated with any of DRX on-duration timer (for sidelink), a DRX slot offset (for sidelink), and/or DRX Inactivity timer (for sidelink) of the second device. Furthermore, when the first sidelink resource is selected for an initial or new PSCCH transmission and/or a PSSCH initial or new transmission, the first device may select the first sidelink resource without basing on DRX retransmission timer (for sidelink) of the second device.

In one embodiment, when the first sidelink resource is selected for delivering a new data packet (at first time), the first device may select the first sidelink resource based on (sidelink) DRX operation associated with any of DRX on-duration timer (for sidelink), a DRX slot offset (for sidelink), and/or DRX Inactivity timer (for sidelink) of the second device. Preferably, when the first sidelink resource is selected for delivering a new data packet (at first time), the first device may select the first sidelink resource without basing on DRX retransmission timer (for sidelink) of the second device.

In one embodiment, when the first sidelink resource is selected for a PSCCH retransmission and/or a PSSCH retransmission (based on detecting HARQ-ACK feedback as NACK), the first device may select the first sidelink resource based on DRX retransmission timer (for sidelink) of the second device. Furthermore, when the first sidelink resource is selected for a PSCCH retransmission and/or a PSSCH retransmission, the first device may select the first sidelink resource without basing on any of DRX on-duration timer (for sidelink), a DRX slot offset (for sidelink), and/or DRX Inactivity timer (for sidelink) of the second device.

In one embodiment, when the first sidelink resource is selected for delivering a data packet, which has been transmitted or delivered at least one time, (based on detecting HARQ-ACK feedback as NACK), the first device may select the first sidelink resource based on DRX retransmission timer (for sidelink) of the second device. Furthermore, when the first sidelink resource is selected for delivering a data packet, which has been transmitted or delivered at least one time, the first device may select the first sidelink resource without basing on any of DRX on-duration timer (for sidelink), a DRX slot offset (for sidelink), and/or DRX Inactivity timer (for sidelink) of the second device.

In one embodiment, the first device may not be configured with partial sensing. The first device may perform full sensing for sidelink resource selection. The first device may derive or determine the valid sidelink resource set, from the candidate sidelink resources in the set of the candidate slots, based on sensing result of full sensing. Full sensing may mean that the first device monitor slots which can belong to a sidelink resource pool within the sensing window except for those in which its own transmissions occur. The sensing window may be by the range of slots [n−$T_0$, n−$T_{proc,0}$). In one embodiment, $T_0$ may be a configured parameter or an internal parameter. $T_{proc,0}$ may comprise sensing processing time.

Figure 10:
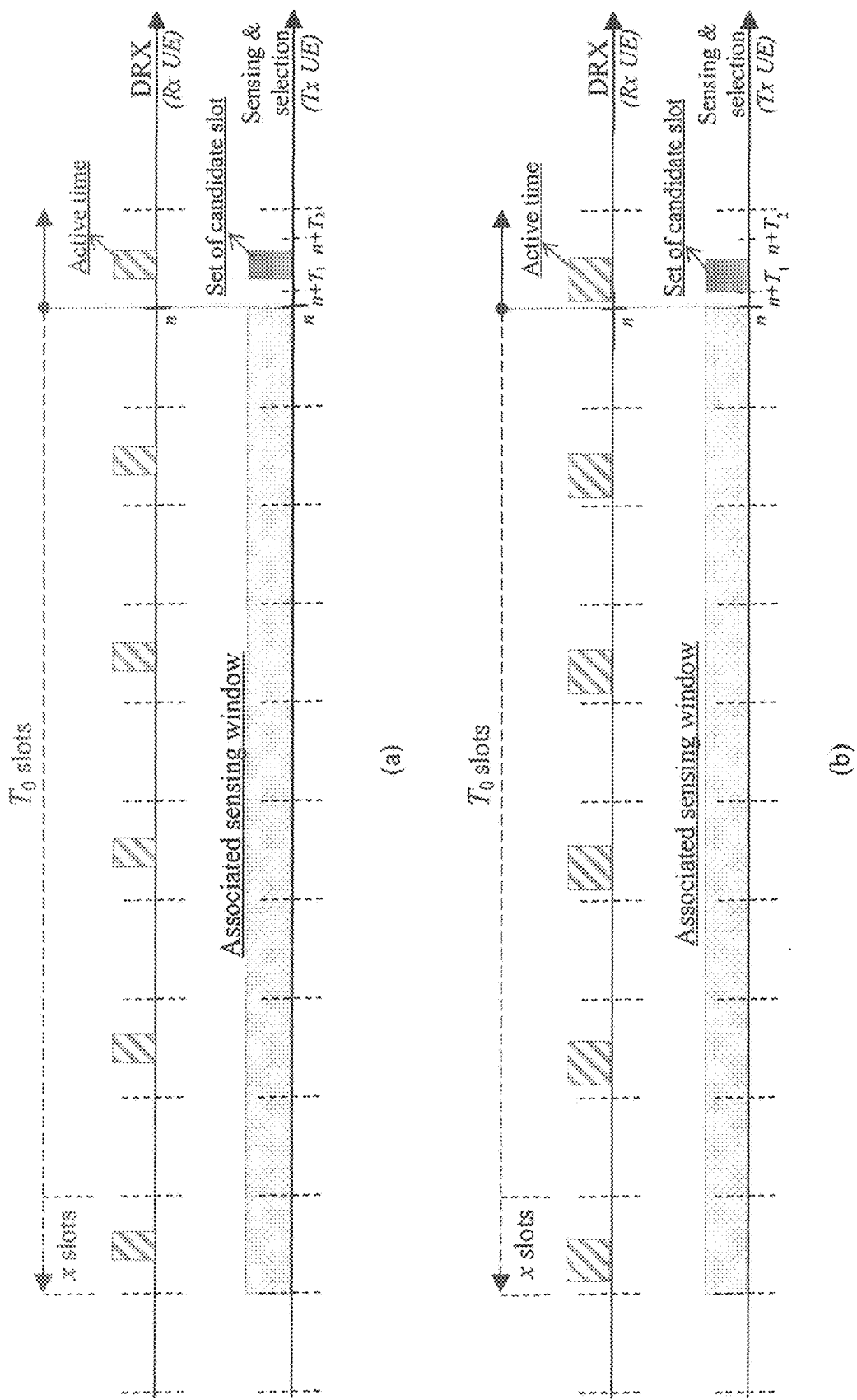
FIG. 10 is a diagram according to one exemplary embodiment.

As an example shown in FIG. 10, a Tx UE may perform full sensing for sidelink resource (re-)selection. When the Tx UE is triggered or requested in slot n to select sidelink resources for performing sidelink transmission to a Rx UE, the Tx UE may derive or determine a set of candidate slots based on (sidelink) active time of the Rx UE. The Tx UE may derive or identify a valid sidelink resource set from the set of candidate slots, based on sensing result of full sensing. The sensing result of full sensing may be derived from the associated sensing window, such as the range of slots [n−$T_0$, n−$T_{proc,0}$).

The Tx UE may select a first sidelink resource from the valid sidelink resource set to perform sidelink transmission to the Rx UE. As shown in FIG. 10(a), the (sidelink) active time of the Rx UE after the sidelink resource (re-)selection trigger is fully within time interval of selection window [n+$T_1$, n+$T_2$]. The Tx UE may derive or determine the set of candidate slots, where the set of candidate slots comprise (all) slots of the (sidelink) active time of the Rx UE. As shown in FIG. 10(b), the (sidelink) active time of the Rx UE after the sidelink resource (re-flection trigger may partially be within time interval of selection window [n+$T_1$, n+$T_2$]. The Tx UE may derive or determine the set of candidate slots, where the set of candidate slots comprise (all) joint or intersection slots of slots of the (sidelink) active time of the Rx UE and the time interval of selection window.

Additionally or alternatively, the first device may be configured with partial sensing. The first device may perform partial sensing for sidelink resource selection. The first device may derive or determine the valid sidelink resource set, from the candidate sidelink resources in the set of the candidate slots, based on sensing result of partial sensing. The set of candidate slots may comprise at least Y slots. In one embodiment, the value Y may be specified/(pre-)configured. Partial sensing may mean that the first device monitor a subset of slots which can belong to a sidelink resource pool within the sensing window except for those in which its own transmissions occur.

In one embodiment, the sensing window may be by the range of slots [n−$T_0$, n−$T_{proc,0}$). To may be a configured parameter or an internal parameter. $T_{proc,0}$ may comprise sensing processing time. The subset of slots for partial sensing may be derived, determined, or associated with the set of candidate slots. The subset of slots for partial sensing may also be derived, determined, or associated with the set of candidate slots with a periodicity. The periodicity may be the (sidelink) DRX cycle of the second UE. Preferably, the periodicity may be specified or (pre-)configured. The periodicity may also be determined based on service or LCP between the first UE and the second UE.

Figure 11:
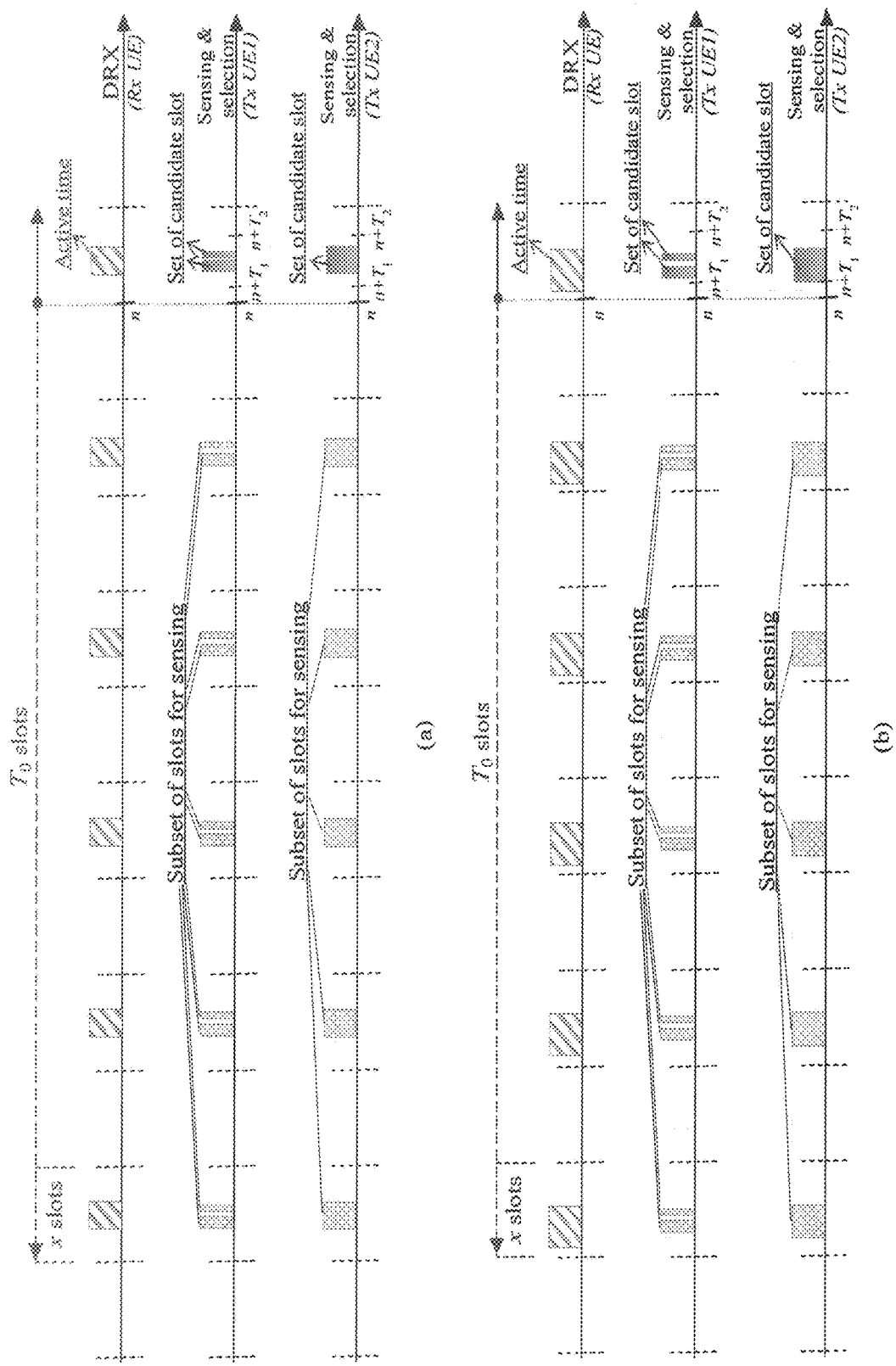
FIG. 11 is a diagram according to one exemplary embodiment.

As example shown in FIG. 11, a Tx UE may perform partial sensing for sidelink resource (re-)selection. When the Tx UE is triggered or requested in slot n to select sidelink resources for performing sidelink transmission to a Rx UE, the Tx UE may derive or determine a set of candidate slots based on (sidelink) active time of the Rx UE. The set of candidate slots may comprise at least Y slots. The Tx UE may derive a valid sidelink resource set from the set of candidate slots, based on sensing result of partial sensing. The sensing result of partial sensing may be derived from a subset of slots for sensing within the associated sensing window, such as the range of slots [n−$T_0$, n−$T_{proc,0}$). The subset of slots for sensing may be derived, determined, or associated with the set of candidate slots.

The Tx UE may select a first sidelink resource from the valid sidelink resource set to perform sidelink transmission to the Rx UE. As shown in FIG. 11(a), the (sidelink) active time of the Rx UE after the sidelink resource (re-)selection trigger may be fully within time interval of selection window [n+$T_1$, n+$T_2$]. The Tx UE1 may derive or determine the set of candidate slots, where the set of candidate slots comprise part of slots of the (sidelink) active time of the Rx UE. The set of candidate slots may comprise at least Y slots.

The Tx UE2 may derive or determine the set of candidate slots, where the set of candidate slots comprise all slots of the (sidelink) active time of the Rx UE. As shown in FIG. 11(b), the (sidelink) active time of the Rx UE after the sidelink resource (re-)selection trigger is partially within time interval of selection window [n+$T_1$, n+$T_2$]. The Tx UE1 may derive or determine the set of candidate slots, where the set of candidate slots comprise part of joint/intersection slots of slots of the (sidelink) active time of the Rx UE and the time interval of selection window. The set of candidate slots may comprise at least Y slots. The Tx UE2 may derive or determine the set of candidate slots, where the set of candidate slots comprise all joint or intersection slots of slots of the (sidelink) active time of the Rx UE and the time interval of selection window.

In one embodiment, (the time length of) the DRX on-duration timer (for sidelink) may be configured or set for the second device. Furthermore, (the time length of) the DRX on-duration timer (for sidelink) may be configured or set per device. However, (the time length of) the DRX on-duration timer (for sidelink) may not be configured or set per link and/or per sidelink resource pool.

In one embodiment, (the time length of) the DRX slot offset (for sidelink) may be configured or set for the second device. Furthermore, (the time length of) the DRX slot offset (for sidelink) may be configured or set per device. However, (the time length of) the DRX slot offset (for sidelink) may not be configured or set per link and/or per sidelink resource pool.

In one embodiment, (the time length of) the DRX Inactivity timer (for sidelink) may be configured or set for the second device. Furthermore, (the time length of) the DRX Inactivity timer (for sidelink) may be configured or set per device. However, (the time length of) the DRX Inactivity timer (for sidelink) may not be configured or set per link per sidelink resource pool.

In one embodiment, (the time length of) the DRX retransmission timer (for sidelink) may be configured or set for the second device. Furthermore, (the time length of) the DRX retransmission timer (for sidelink) may be configured or set per device. However, (the time length of) the DRX retransmission timer (for sidelink) may not be configured or set per link and/or per sidelink resource pool.

In one embodiment, (the time length of) the DRX HARQ RTT time or timer (for sidelink) may be configured or set for the second device. Furthermore, (the time length of) the DRX HARQ RTT time or timer (for sidelink) may be configured or set per device. However, (the time length of) the DRX HARQ RTT time or timer (for sidelink) may not be configured pr set per link and/or per sidelink resource pool.

Method b

The general concept of Method b is that transmitting device (e.g. a first device) performs resource (re)selection with restriction in specific time duration. In one embodiment, the specific time duration may be independently or separately derived or determined from time interval of selection window.

In one embodiment, when a first device (is triggered or requested to) performs sidelink resource (re-)selection procedure for a sidelink transmission to a second device, the first device will select a first sidelink resource based on restriction in the specific time duration. The specific time duration could be associated with the second device. The first device may select the first sidelink resource from or within a set of candidate slots, wherein the set of candidate slots are determined or derived based on restriction in the specific time duration. The set of candidate slots may be included within the specific time duration. It may mean that for selecting the first sidelink resource, the first device may exclude candidate sidelink resources in slots out of the specific time duration.

In one embodiment, the set of candidate slots is comprised within a time interval of selection window. The time interval of selection window may start $T_1$ after sidelink resource (re-)selection trigger, and may be bounded by at least $T_2$ and/or a remaining packet delay budget. When the first device is triggered or requested in slot n to determine or identify a valid sidelink resource set for selecting the first sidelink resource, the time interval of selection window may be $[n+T_1, n+T_2]$.

In one embodiment, the set of candidate slots may be comprised within joint or intersection slots of the time interval of selection window and the specific time duration. The derivation or determination of the time interval of selection window may be independent or separate from the specific time duration.

In one embodiment, $T_1$ may be selected by the first device implementation under $0 \leq T_1 \leq T_{proc,1}$. $T_{proc,1}$ may comprise the allowable maximum processing time for performing resource reselection and/or for generating the sidelink transmission. Additionally or alternatively, $T_1$ may be selected by the first device implementation under $T_{proc,1} \leq T_1 \leq T_{proc,1'}$. Additionally or alternatively, $T_1$ may be selected by the first device implementation under $T_{proc,1} \leq T_1$. In one embodiment, $T_{proc,1}$ may comprise resource reselection processing time and/or processing time for generating the sidelink transmission. $T_{proc,1'}$ could be equal to 4. Furthermore, $T_{proc,1'}$ could be (pre-)configured per UE or device and/or (pre-)configured for a pedestrian UE.

In one embodiment, $T_2$ may be set to the remaining packet delay budget, when the remaining packet delay budget is shorter than a configured parameter $T_{2min}$. Furthermore, $T_2$ may be set by the first device implementation subject to $T_{2min} \leq T_2 \leq$ remaining packet delay budget, when the remaining packet delay budget is larger than a configured parameter $T_{2min}$. Additionally or alternatively, the time interval of selection window may be derived or determined by the specific time duration. The set of candidate slots may be (full) slots of the time interval of selection window.

In one embodiment, $T_1$ may be selected by the first device implementation under $T_{start} \leq n+T_1 \leq n+T_{proc,1}$ if $T_{start} \leq n+T_{proc,1}$ and/or $T_{start} \leq n+T_1$ if $n+T_{proc,1} \leq T_{start}$. $T_{proc,1}$ may comprise the allowable maximum processing time for performing resource reselection and/or for generating the sidelink transmission. $T_{start}$ may be the first slot of the specific time duration after sidelink resource (re-)selection trigger or after the slot n. Additionally or alternatively, $T_1$ may be selected by the first device implementation under $T_{proc,1} \leq T_1 \leq T_{proc,1'}$, if $T_{start} \leq n+T_{proc,1}$, $T_{start} \leq n+T_1 \leq n+T_{proc,1'}$ if $n+T_{proc,1} \leq T_{start} \leq n+T_{proc,1'}$, and/or $T_{start} \leq n+T_1$ if $n+T_{proc,1'} \leq T_{start}$. In one embodiment, $T_{proc,1}$ may comprise resource reselection processing time and/or processing time for generating the sidelink transmission. $T_{proc,1'}$ could be equal to 4. $T_{proc,1'}$ could be (pre-)configured per UE or device and/or (pre-)configured for a pedestrian UE. $T_{start}$ may be the first slot of the specific time duration after sidelink resource (re-)selection trigger or after the slot n.

In one embodiment, if $n+T_{2min} \leq T_{last}$, $T_2$ may be set to the remaining packet delay budget, when the remaining packet delay budget is shorter than a configured parameter $T_{2min}$. Furthermore, if $n+T_{2min} \leq T_{last}$, $T_2$ may be set by the first device implementation subject to $n+T_{2min} \leq n+T_2 \leq \min\{T_{last}, n+\text{remaining packet delay budget}\}$, when the remaining packet delay budget is larger than a configured parameter $T_{2min}$. If $T_{last} \leq n+T_{2min}$, $n+T_2$, may be set to $\min\{T_{last}, n+\text{remaining packet delay budget}\}$, when the remaining packet delay budget is shorter than a configured parameter $T_{2min}$. If $T_{last} \leq n+T_{2min}$, $T_2$ may be set by the first device implementation subject to $T_{last}$, when the remaining packet delay budget is larger than a configured parameter $T_{2min}$. $T_{last}$ may be the last slot of the (last) specific time duration, wherein the (last) specific time duration comprises any slot after sidelink resource (re-)selection trigger or after the slot n, and wherein the (last) specific time duration comprises any slot before $n+T_{2min}$ or before n+remaining packet delay budget.\

In one embodiment, the resource (re-)selection may be triggered or requested by the higher layer (of the first device). The valid sidelink resource set may be derived or determined or identified from the candidate sidelink resources in the set of the candidate slots. The first device may derive or determine or identify the valid sidelink resource set, from the candidate sidelink resources in the set of the candidate slots, based on sensing result.

In one embodiment, the first device may select the first sidelink resource from the valid sidelink resource set. Thee first device may report the valid sidelink resource set to the higher layer (of the first device). The higher layer (of the first device) may select the first sidelink resource from the valid sidelink resource set.

In one embodiment, the specific time duration may mean or may comprise the time while one or more specific timer(s) of the first device is running. The specific time duration may not comprise the time while none of the one or more specific timer(s) of the first device is running. The one or more specific timer(s) may be utilized for restricting resource (re)selection in the specific time duration. The resource (re)selection may be utilized for sidelink transmission to a second device. The specific time duration may be derived or determined for the link or connection between the first device and the second device. The one or more specific timer(s) may be configured or operated for the link or connection between the first device and the second device.

In one embodiment, one specific timer may start periodically. The one specific timer may be configured with a time length. The one specific timer may start or restart event-triggered. The one specific timer may be configured with a time length.

In one embodiment, the first device may start or restart the one specific timer, in response to the first device transmits a PSCCH (initial or new) transmission to the second device. Additionally or alternatively, the one specific timer may start or restart after a time duration of transmitting PSCCH or PSSCH (from the first device). The PSCCH or PSSCH transmission may be last reserved PSCCH or PSSCH transmission for a same data packet before performing the sidelink resource reselection.

Additionally or alternatively, the first device may start or restart the one specific timer, in response to detecting SL HARQ-ACK feedback, which is associated with a (initial or new) PSCCH or associated with a (initial or new) PSSCH transmission scheduled by the (initial or new) PSCCH. The (initial or new) PSSCH transmission and the (initial or new) PSCCH transmission may be transmitted from the first device to the second device. The (initial or new) PSSCH transmission and the (initial or new) PSCCH transmission may be performed, transmitted, or received in the same slot.

In one embodiment, the (initial or new) PSCCH may mean that the PSCCH indicates or schedules a new PSSCH transmission. The (initial or new) PSSCH may mean that the PSSCH delivers a new data packet (at first time). The SL HARQ-ACK feedback may be ACK or NACK. The first device may not start or restart the one specific timer, in response to detecting SL HARQ-ACK feedback as DTX or not detecting associated SL HARQ-ACK feedback.

In one embodiment, the first device may perform a PSCCH or PSSCH transmission to the second device. The first device may detect or receive SL HARQ-ACK feedback associated with the PSCCH or PSSCH transmission from the second device. The first device may start or restart the one specific timer, when the first device detects associated SL HARQ-ACK feedback as NACK from the second device. The PSCCH or PSSCH transmission may be the last reserved PSCCH or PSSCH transmission for a same data packet before performing the sidelink resource reselection. In one embodiment, the first device may not start or restart the one specific timer, when the first device detects associated SL HARQ-ACK feedback as ACK from the second device or the first device does not detect associated SL HARQ-ACK feedback from the second device. The one specific timer may start or restart after a time duration from the (slot) time of the SL HARQ-ACK feedback.

In one embodiment, for different (start or restart) events, there may be different event-triggered specific timers. The one or more specific timer(s) may comprise the periodical specific timer and/or the event-triggered specific timer(s). The first device may share, have, or configure the same (time length) of the periodical specific timer with the second device. The first device may share, have, or configure the same (time length) of the event-triggered specific timer(s) with the second device. The first device may transmit or deliver (the first device's) setting or configuration of the periodical specific timer and/or the event-triggered specific timer(s) to the second device. The first device may receive (the second device's) setting or configuration of the periodical specific timer and/or the event-triggered specific timer(s) from the second device.

In one embodiment, the specific time duration may mean or comprise the time while the first device is in active time. The first device may perform resource (re)selection with consideration on (sidelink) DRX operation of the first UE. The resource (re)selection may be utilized for sidelink transmission to a second device. The active time may be derived or determined for the link or connection between the first device and the second device. The (sidelink) DRX operation of first UE may be operated or performed for the link or connection between the first device and the second device.

In one embodiment, the first device may be configured with (sidelink) DRX operation, and the first device may not share, have, or configure the same (sidelink) DRX-related parameters) with the second device. Additionally or alternatively, the first device may be configured with (sidelink) DRX operation, the first device may share, have, or configure the same (sidelink) DRX-related parameters) with the second device.

In one embodiment, the (sidelink) DRX-related parameters) may comprise parameters) about (sidelink) DRX cycle. The (sidelink) DRX-related parameters) may comprise (time length of) a DRX on-duration timer (for sidelink) and/or a DRX slot offset (for sidelink).

In one embodiment, the (sidelink) DRX-related parameters) may comprise (time length of) a DRX Inactivity timer (for sidelink). The first device may start or restart the DRX Inactivity timer (for sidelink), in response to the first device transmits a (initial or new) PSCCH transmission to the second device. Additionally or alternatively, the first device may start or restart the DRX Inactivity timer (for sidelink), in response to detecting SL HARQ-ACK feedback, which is associated with a (initial or new) PSCCH or associated with a (initial or new) PSSCH transmission scheduled by the (initial/new) PSCCH.

In one embodiment, the (initial or new) PSSCH transmission and the (initial or new) PSCCH transmission are transmitted from the first device to the second device. The (initial or new) PSSCH transmission and the (initial or new) PSCCH transmission are performed, transmitted, or received in the same slot. The (initial or new) PSCCH may mean that the PSCCH indicates/schedules a new PSSCH transmission. The (initial or new) PSSCH may mean that the PSSCH delivers a new data packet (at first time). The SL HARQ-ACK feedback may be ACK or NACK. The first device may not start or restart the DRX Inactivity timer (for sidelink), in response to detecting SL HARQ-ACK feedback as DTX or not detecting associated SL HARQ-ACK feedback.

In one embodiment, the (sidelink) DRX-related parameter(s) may comprise (time length of) a DRX retransmission timer (for sidelink). The first device may perform a PSCCH or PSSCH transmission to the second device. The first device may detect or receive SL HARQ-ACK feedback associated with the PSCCH or PSSCH transmission from the second device. The first device may start or restart the DRX retransmission timer (for sidelink), when the first device detects associated SL HARQ-ACK feedback as NACK from the second device. The PSCCH or PSSCH transmission may be the last reserved PSCCH or PSSCH transmission for a same data packet before performing the sidelink resource reselection.

In one embodiment, the first device may not start or restart the DRX retransmission timer (for sidelink), when the first device detects associated SL HARQ-ACK feedback as ACK from the second device or the first device does not detect associated SL HARQ-ACK feedback from the second device. The DRX retransmission timer (for sidelink) may start or restart after a time duration from the (slot) time of the SL HARQ-ACK feedback. The time duration may mean a DRX HARQ RTT time for sidelink.

In one embodiment, the first device may (re-)start the DRX HARQ RTT timer in response to reception of the SL HARQ-ACK feedback. The PSCCH or PSSCH transmission may be the last reserved PSCCH or PSSCH transmission for a same data packet before performing the sidelink resource reselection. The first device may start or restart the DRX retransmission timer (for sidelink) when the DRX HARQ RTT timer expires. Additionally or alternatively, the DRX retransmission timer (for sidelink) may start or restart after a time duration from transmitting the PSCCH/PSSCH (from the first device). The time duration may mean a DRX HARQ RTT time for sidelink.

In one embodiment, the first device may (re-)start the DRX HARQ RTT timer in response to transmitting the PSCCH or PSSCH. The PSCCH or PSSCH transmission may be the last reserved PSCCH or PSSCH transmission for a same data packet before performing the sidelink resource reselection. The first device may start or restart the DRX retransmission timer (for sidelink) when the DRX HARQ RTT timer expires.

In one embodiment, the active time of the first device may include or comprise the time while any of the DRX on-duration timer (for sidelink), DRX Inactivity timer (for sidelink), or DRX retransmission timer (for sidelink) is running. For a time or slot while the first device is not in active time, the first device may be in non-active time. The first device may be in non-active time while none of the DRX on-duration timer (for sidelink), DRX Inactivity timer (for sidelink), and DRX retransmission timer (for sidelink) is running. The first device may not monitor or decode PSCCH and/or PSSCH (at least from the second device) in non-active time. The first device may monitor or decode PSCCH and/or PSSCH (at least from the second device) in active time.

In one embodiment, the first sidelink resource may be selected for an initial or new PSCCH transmission. The first sidelink resource may be selected for a PSSCH initial/new transmission scheduled by the initial or new PSCCH.

In one embodiment, the sidelink transmission, from the first device to the second device, may be an initial or new PSCCH transmission. The sidelink transmission, from the first device to the second device, may be an initial or new PSSCH transmission scheduled by the initial or new PSCCH. The initial or new transmission PSSCH and the initial or new PSCCH transmission may be performed, transmitted, or received in the same slot. The initial or new PSCCH may mean that the PSCCH indicates or schedules a new PSSCH transmission. The initial or new PSSCH may mean that the PSSCH delivers a new data packet (at first time).

In one embodiment, the first sidelink resource may be selected for a PSCCH retransmission (based on detecting HARQ-ACK feedback as NACK or DTX). The first sidelink resource may be selected for a PSSCH retransmission (based on detecting HARQ-ACK feedback as NACK or DTX).

In one embodiment, the sidelink transmission, from the first device to the second device, may be a PSCCH retransmission (based on detecting HARQ-ACK feedback as NACK or DTX). The sidelink transmission, from the first device to the second device, may be a PSSCH retransmission (based on detecting HARQ-ACK feedback as NACK or DTX). The PSCCH retransmission may mean that the PSCCH indicates or schedules an associated PSSCH retransmission. The PSCCH retransmission and the associated PSSCH retransmission may be performed, transmitted, or received in the same slot. The PSSCH retransmission may mean that the PSSCH delivers a data packet, which has been transmitted or delivered at least one time.

In one embodiment, the first sidelink resource may not be selected for a PSCCH retransmission (based on detecting HARQ-ACK feedback as NACK). Additionally or alternatively, the first sidelink resource may not be selected for a PSSCH retransmission based on detecting HARQ-ACK feedback as NACK. The first device may select, determine, or acquire a second sidelink resource for PSCCH retransmission and/or PSSCH retransmission (to the second device) without restriction in the specific time duration.

In one embodiment, when the first sidelink resource is selected for an initial or new PSCCH transmission and/or an initial or new PSSCH transmission, the first device may select the first sidelink resource with restriction in the specific time duration associated with any of the periodical specific timer, the event-triggered specific timer(s), DRX on-duration timer (for sidelink), a DRX slot offset (for sidelink), DRX Inactivity timer (for sidelink), and/or DRX retransmission timer (for sidelink) of the first device. When the first sidelink resource is selected for delivering a new data packet (at first time), the first device may select the first sidelink resource with restriction in the specific time duration associated with any of the periodical specific timer, the event-triggered specific timer(s), DRX on-duration timer (for sidelink), a DRX slot offset (for sidelink), DRX Inactivity timer (for sidelink), and/or DRX retransmission timer (for sidelink) of the first device. When the first sidelink resource is selected for a PSCCH retransmission and/or a PSSCH retransmission (based on detecting HARQ-ACK feedback as NACK or DTX), the first device may select the first sidelink resource with restriction in the specific time duration associated with any of the periodical specific timer, the event-triggered specific timer(s), DRX on-duration timer (for sidelink), a DRX slot offset (for sidelink), DRX Inactivity timer (for sidelink), and/or DRX retransmission timer (for sidelink) of the first device.

In one embodiment, when the first sidelink resource is selected for delivering a data packet, which has been transmitted or delivered at least one time (based on detecting HARQ-ACK feedback as NACK or DTX), the first device may select the first sidelink resource with restriction in the specific time duration associated with any of the periodical specific timer, the event-triggered specific timer(s), DRX on-duration timer (for sidelink), a DRX slot offset (for sidelink), DRX Inactivity timer (for sidelink), and/or DRX retransmission timer (for sidelink) of the first device. When the first sidelink resource is selected for an initial or new PSCCH transmission and/or an initial or new PSSCH transmission, the first device may select the first sidelink resource with restriction in the specific time duration associated with any of the periodical specific timer, the event-triggered specific timer(s), DRX on-duration timer (for sidelink), a DRX slot offset (for sidelink), and/or DRX Inactivity timer (for sidelink) of the first device. When the first sidelink resource is selected for an initial or new PSCCH transmission and/or an initial or new PSSCH transmission, the first device may select the first sidelink resource without restriction in the specific time duration associated with DRX retransmission timer (for sidelink) of the first device.

In one embodiment, when the first sidelink resource is selected for delivering a new data packet (at first time), the first device may select the first sidelink resource with restriction in the specific time duration associated with any of the periodical specific timer, the event-triggered specific timer(s), DRX on-duration timer (for sidelink), a DRX slot offset (for sidelink), and/or DRX Inactivity timer (for sidelink) of the first device. When the first sidelink resource is selected for delivering a new data packet (at first time), the first device may select the first sidelink resource without restriction in the specific time duration associated with DRX retransmission timer (for sidelink) of the first device.

In one embodiment, when the first sidelink resource is selected for a PSCCH retransmission and/or a PSSCH retransmission (based on detecting HARQ-ACK feedback as NACK), the first device may select the first sidelink resource with restriction in the specific time duration associated with any of the event-triggered specific timer(s), DRX retransmission timer (for sidelink) of the first device. When the first sidelink resource is selected for a PSCCH retransmission and/or a PSSCH retransmission, the first device may select the first sidelink resource without restriction in the specific time duration associated with any of the periodical specific timer, DRX on-duration timer (for sidelink), a DRX slot offset (for sidelink), and/or DRX Inactivity timer (for sidelink) of the first device.

In one embodiment, when the first sidelink resource is selected for delivering a data packet, which has been transmitted or delivered at least one time, (based on detecting HARQ-ACK feedback as NACK), the first device may select the first sidelink resource with restriction in the specific time duration associated with any of the event-triggered specific timer(s), DRX retransmission timer (for sidelink) of the first device. When the first sidelink resource is selected for delivering a data packet, which has been transmitted or delivered at least one time, the first device may select the first sidelink resource without restriction in the specific time duration associated with any of the periodical specific timer, DRX on-duration timer (for sidelink), a DRX slot offset (for sidelink), and/or DRX Inactivity timer (for sidelink) of the first device.

In one embodiment, the first device may not be configured with partial sensing. The first device may perform full sensing for sidelink resource selection. The first device may derive or determine the valid sidelink resource set, from the candidate sidelink resources in the set of the candidate slots, based on sensing result of full sensing. In one embodiment, full sensing may mean that the first device monitor slots which can belong to a sidelink resource pool within the sensing window except for those in which its own transmissions occur. The sensing window may be by the range of slots $[n-T_0, n-T_{proc,0}]$. In one embodiment, $T_0$ may be a configured parameter or an internal parameter. $T_{proc,0}$ may comprise sensing processing time.

Figure 12:
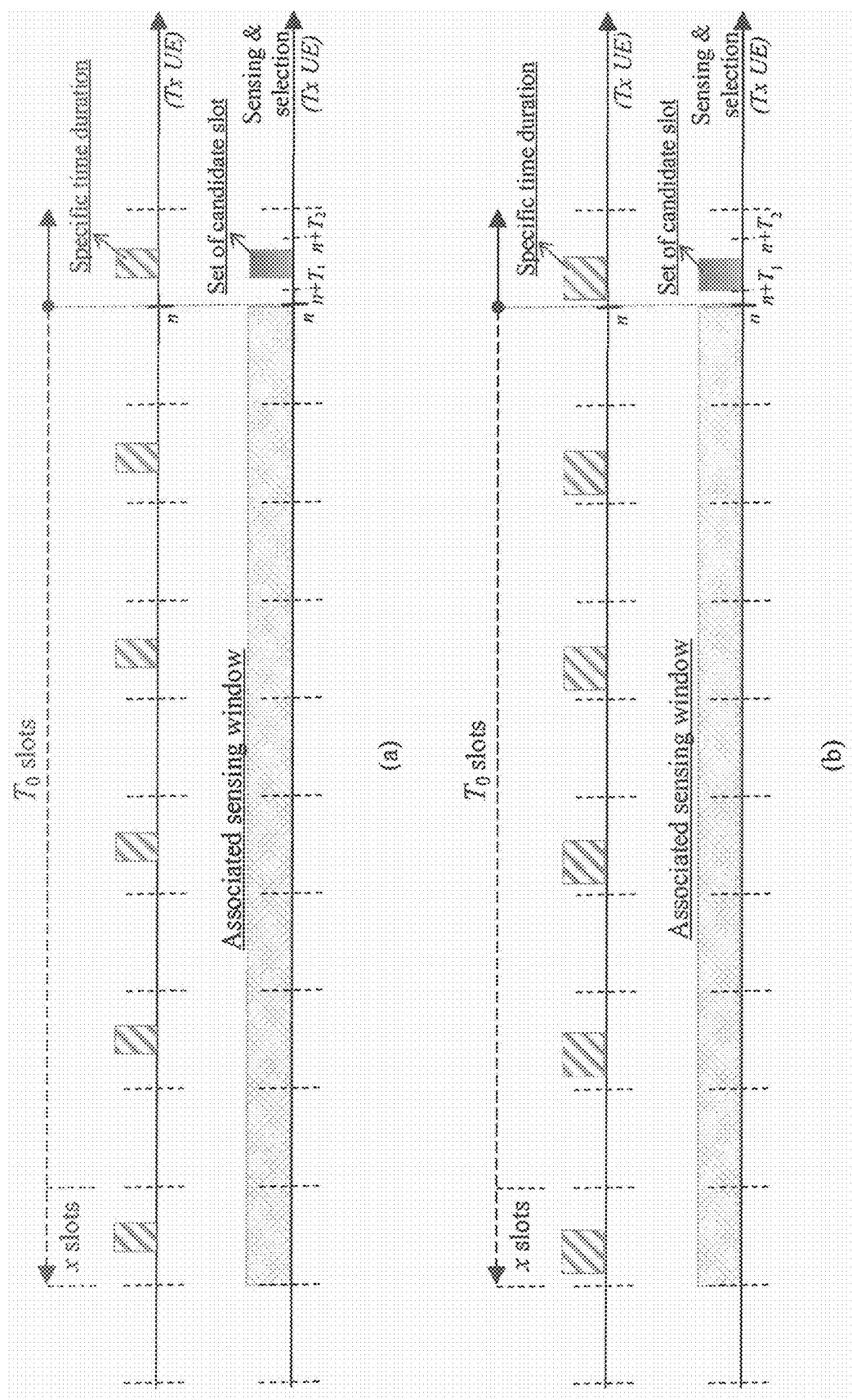
FIG. 12 is a diagram according to one exemplary embodiment.

As an example shown in FIG. 12, a Tx UE may perform full sensing for sidelink resource (re-)selection. When the Tx UE is triggered or requested in slot n to select sidelink resources for performing sidelink transmission to a Rx UE, Tx UE may derive or determine a set of candidate slots based on specific time duration associated with the Rx UE. Tx UE may derive a valid sidelink resource set from the set of candidate slots, based on sensing result of full sensing. The sensing result of full sensing may be derived from the associated sensing window, such as the range of slots $[n-T_0, n-T_{proc,0}]$. The Tx UE may select a first sidelink resource from the valid sidelink resource set to perform sidelink transmission to the Rx UE.

As shown in FIG. 12(a), the specific time duration associated with the Rx UE after the sidelink resource (re-)selection trigger is fully within time interval of selection window $[n+T_1, n+T_2]$. The Tx UE may derive or determine the set of candidate slots, where the set of candidate slots comprise (all) slots of the specific time duration associated with Rx UE. As shown in FIG. 12(b), the specific time duration associated with the Rx UE after the sidelink resource (re-)selection trigger is partially within time interval of selection window $[n+T_1, n+T_2]$. The Tx UE may derive or determine the set of candidate slots, where the set of candidate slots comprise (all) joint or intersection slots of slots of the specific time duration associated with the Rx UE and the time interval of selection window.

Additionally or alternatively, the first device may be configured with partial sensing. The first device may perform partial sensing for sidelink resource selection. The first device may derive or determine the valid sidelink resource set, from the candidate sidelink resources in the set of the candidate slots, based on sensing result of partial sensing. The set of candidate slots may comprise at least Y slots. The value Y may be specified or (pre-)configured.

In one embodiment, partial sensing may mean that the first device monitor a subset of slots which can belong to a sidelink resource pool within the sensing window except for those in which its own transmissions occur. The sensing window may be by the range of slots $[n-T_0, n-T_{proc,0}]$. To may be a configured parameter or an internal parameter. $T_{proc,0}$ may comprise sensing processing time. In one embodiment, the subset of slots for partial sensing may be derived, determined, or associated with the set of candidate slots. Furthermore, the subset of slots for partial sensing may be derived, determined, or associated with the set of candidate slots with a periodicity. The periodicity may be the (sidelink) DRX cycle of the first UE. The periodicity may also be specified or (pre-)configured. Furthermore, the periodicity may be determined based on service or Logical Channel Prioritization (LCP) between the first UE and the second UE.

Figure 13:
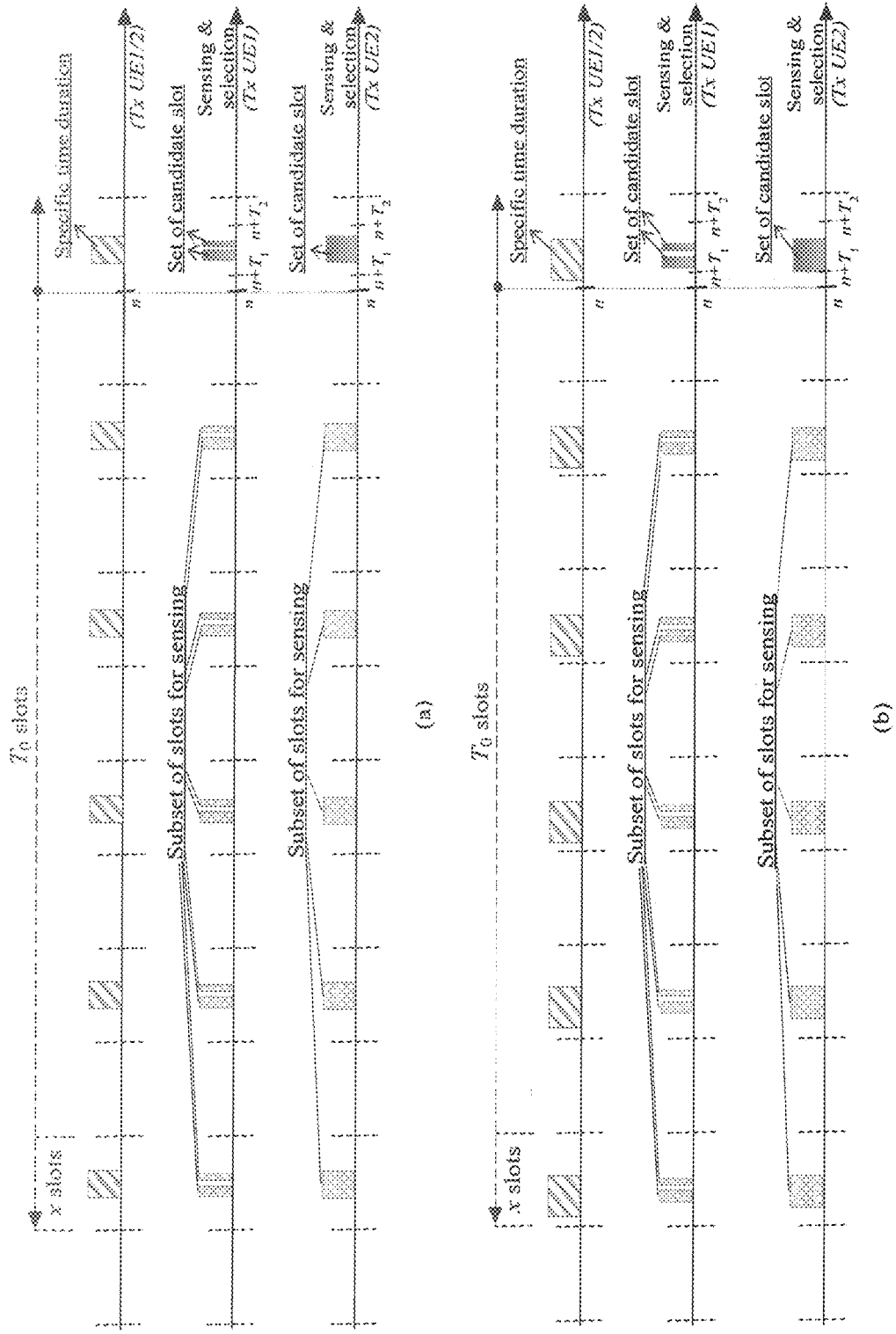
FIG. 13 is a diagram according to one exemplary embodiment.

As an example shown in FIG. 13, a Tx UE may perform partial sensing for sidelink resource (re-)selection. When the Tx UE is triggered or requested in slot n to select sidelink resources for performing sidelink transmission to a Rx UE, the Tx UE may derive or determine a set of candidate slots based on specific time duration associated with the Rx UE. In one embodiment, the set of candidate slots may comprise at least Y slots. The Tx UE may derive a valid sidelink resource set from the set of candidate slots, based on sensing result of partial sensing. The sensing result of partial sensing may be derived from a subset of slots for sensing within the associated sensing window, such as the range of slots $[n-T_0, n-T_{proc,0}]$. Preferably, the subset of slots for sensing may be derived/determined/associated with the set of candidate slots. The Tx UE may select a first sidelink resource from the valid sidelink resource set to perform sidelink transmission to the Rx UE.

As shown in FIG. 13(a), the specific time duration associated with the Rx UE after the sidelink resource (re-)selection trigger is fully within time interval of selection window $[n+T_1, n+T_2]$. Tx UE1 may derive or determine the set of candidate slots, where the set of candidate slots comprise part of slots of the specific time duration associated with the Rx UE. In one embodiment, the set of candidate slots may comprise at least Y slots. Tx UE2 may derive or determine the set of candidate slots, where the set of candidate slots comprise all slots of the specific time duration associated with Rx UE.

As shown in FIG. 13(b), the specific time duration associated with the Rx UE after the sidelink resource (re-)selection trigger may be partially within time interval of selection window $[n+T_1, n+T_2]$. Tx UE1 may derive or determine the set of candidate slots, where the set of candidate slots comprise part of joint or intersection slots of slots of the specific time duration associated with the Rx UE and the time interval of selection window. The set of candidate slots may comprise at least Y slots. The Tx UE2 may derive or determine the set of candidate slots, where the set of candidate slots comprise all joint or intersection slots of slots of the specific time duration associated with the Rx UE and the time interval of selection window.

In one embodiment, (the time length of) the periodical specific timer may be configured or set for the unicast link or connection between the first device and the second device. Furthermore, (the time length of) the periodical specific timer may be configured or set per link.

In one embodiment, (the time length of) the event-triggered specific timer(s) may be configured or set for the unicast link or connection between the first device and the second device. Furthermore, (the time length of) the event-triggered specific timer(s) may be configured or set per link.

In one embodiment, (the time length of) the periodical specific timer may be configured or set for the sidelink group or the groupcast link or connection between the first device and the second device. Furthermore, (the time length of) the periodical specific timer may be configured or set per link or per sidelink group.

In one embodiment, (the time length of) the event-triggered specific timer(s) may be configured or set for the sidelink group or the groupcast link or connection between the first device and the second device. Furthermore, (the time length of) the event-triggered specific timer(s) may be configured or set per link or per sidelink group.

In one embodiment, (the time length of) the periodical specific timer may be configured or set for the sidelink resource pool. Furthermore, (the time length of) the periodical specific timer may be configured or set per sidelink resource pool. In addition, (the time length of) the periodical specific timer may not be configured or set per link.

In one embodiment, (the time length of) the event-triggered specific timer(s) may be configured or set for the sidelink resource pool. Furthermore, (the time length of) the event-triggered specific timer(s) may be configured or set per sidelink resource pool. In addition, (the time length of) the event-triggered specific timer(s) may not be configured or set per link.

In one embodiment, (the time length of) the periodical specific timer may be configured or set for the first device. Furthermore, (the time length of) the periodical specific timer may be configured or set per device. In addition, (the time length of) the periodical specific timer may not be configured or set per link and/or may not be configured or set per sidelink resource pool.

In one embodiment, (the time length of) the event-triggered specific timer(s) may be configured or set for the first device. Furthermore, (the time length of) the event-triggered specific timer(s) may be configured or set per device. In addition, (the time length of) the event-triggered specific timer(s) may not be configured or set per link and/or may not be configured or set per sidelink resource pool.

In one embodiment, (the time length of) the DRX on-duration timer (for sidelink) may be configured or set for the first device. Furthermore, (the time length of) the DRX on-duration timer (for sidelink) may be configured or set per device. In addition, (the time length of) the DRX on-duration timer (for sidelink) may not be configured or set per link and/or may not be configured or set per sidelink resource pool.

In one embodiment, (the time length of) the DRX slot offset (for sidelink) may be configured or set for the first device. Furthermore, (the time length of) the DRX slot offset (for sidelink) may be configured or set per device. In additional, (the time length of) the DRX slot offset (for sidelink) may not be configured or set per link and/or may not be configured or set per sidelink resource pool.

In one embodiment, (the time length of) the DRX Inactivity timer (for sidelink) may be configured or set for the first device. Furthermore, (the time length of) the DRX Inactivity timer (for sidelink) may be configured or set per device. In addition, (the time length of) the DRX Inactivity timer (for sidelink) may not be configured or set per link and/or may not be configured or set per sidelink resource pool.

In one embodiment, (the time length of) the DRX retransmission timer (for sidelink) may be configured or set for the first device. Furthermore, (the time length of) the DRX retransmission timer (for sidelink) may be configured or set per device. In addition, (the time length of) the DRX retransmission timer (for sidelink) may not be configured or set per link and/or may not be configured or set per sidelink resource pool.

In one embodiment, (the time length of) the DRX HARQ RTT time or timer (for sidelink) may be configured or set for the first device. Furthermore, (the time length of) the DRX HARQ RTT time or timer (for sidelink) may be configured or set per device. In addition, (the time length of) the DRX HARQ RTT time or timer (for sidelink) may not be configured or set per link and/or may not be configured or set per sidelink resource pool.

For all Above Concepts, Methods, Alternatives and Embodiments

Any of above methods, alternatives and embodiments may be combined or applied simultaneously.

In one embodiment, the first sidelink resource may be selected for a sidelink unicast transmission. The sidelink transmission, from the first device to the second device, may be a sidelink unicast transmission. The sidelink link or connection between the first device and the second device may be a unicast link or connection. The destination ID of the sidelink transmission, from the first device to the second device, may be set to the identity of the second device.

In one embodiment, (the time length of) the DRX on-duration timer (for sidelink) may be configured or set for the unicast link or connection between the first device and the second device. Furthermore, (the time length of) the DRX on-duration timer (for sidelink) may be configured or set per link.

In one embodiment, (the time length of) the DRX slot offset (for sidelink) may be configured or set for the unicast link or connection between the first device and the second device. Furthermore, (the time length of) the DRX slot offset (for sidelink) may be configured or set per link.

In one embodiment, (the time length of) the DRX Inactivity timer (for sidelink) may be configured or set for the unicast link or connection between the first device and the second device. Furthermore, (the time length of) the DRX Inactivity timer (for sidelink) may be configured or set per link.

In one embodiment, (the time length of) the DRX retransmission timer (for sidelink) may be configured or set for the unicast link or connection between the first device and the second device. Furthermore, (the time length of) the DRX retransmission timer (for sidelink) may be configured or set per link.

In one embodiment, (the time length of) the DRX HARQ RTT time or timer (for sidelink) may be configured or set for the unicast link or connection between the first device and the second device. Furthermore, (the time length of) the DRX HARQ RTT time or timer (for sidelink) may be configured or set per link.

In one embodiment, the first sidelink resource may be selected for a sidelink groupcast transmission. The sidelink transmission, from the first device to the second device, may be a grouplink unicast transmission. The sidelink link or connection between the first device and the second device may be a groupcast link or connection. The first device and the second device are within a same sidelink group. The destination ID of the sidelink transmission, from the first device to the second device, may be the identity of the sidelink group.

In one embodiment, (the time length of) the DRX on-duration timer (for sidelink) may be configured or set for the sidelink group or the groupcast link or connection between the first device and the second device. Furthermore, (the time length of) the DRX on-duration timer (for sidelink) may be configured or set per link or per sidelink group.

In one embodiment, (the time length of) the DRX slot offset (for sidelink) may be configured or set for the sidelink group or the groupcast link or connection between the first device and the second device. Furthermore, (the time length of) the DRX slot offset (for sidelink) may be configured or set per link or per sidelink group.

In one embodiment, (the time length of) the DRX Inactivity timer (for sidelink) may be configured or set for the sidelink group or the groupcast link or connection between the first device and the second device. Furthermore, (the time length of) the DRX Inactivity timer (for sidelink) may be configured or set per link or per sidelink group.

In one embodiment, (the time length of) the DRX retransmission timer (for sidelink) may be configured or set for the sidelink group or the groupcast link or connection between the first device and the second device. Furthermore, (the time length of) the DRX retransmission timer (for sidelink) may be configured or set per link or per sidelink group.

In one embodiment, (the time length of) the DRX HARQ RTT time or timer (for sidelink) may be configured or set for the sidelink group or the groupcast link or connection between the first device and the second device. Furthermore, (the time length of) the DRX HARQ RTT time/timer (for sidelink) may be configured or set per link or per sidelink group.

In one embodiment, (the time length of) the DRX on-duration timer (for sidelink) may be configured or set for the sidelink resource pool. Furthermore, (the time length of) the DRX on-duration timer (for sidelink) may be configured or set per sidelink resource pool. In addition, (the time length of) the DRX on-duration timer (for sidelink) may not be configured or set per link.

In one embodiment, (the time length of) the DRX slot offset (for sidelink) may be configured or set for the sidelink resource pool. Furthermore, (the time length of) the DRX slot offset (for sidelink) may be configured or set per sidelink resource pool. In addition, (the time length of) the DRX slot offset (for sidelink) may not be configured or set per link.

In one embodiment, (the time length of) the DRX Inactivity timer (for sidelink) may be configured or set for the sidelink resource pool. Furthermore, (the time length of) the DRX Inactivity timer (for sidelink) may be configured or set per sidelink resource pool. In addition, (the time length of) the DRX Inactivity timer (for sidelink) may not be configured or set per link.

In one embodiment, (the time length of) the DRX retransmission timer (for sidelink) may be configured or set for the sidelink resource pool. Furthermore, (the time length of) the DRX retransmission timer (for sidelink) may be configured or set per sidelink resource pool. In addition, (the time length of) the DRX retransmission timer (for sidelink) may not be configured or set per link.

In one embodiment, (the time length of) the DRX HARQ RTT time or timer (for sidelink) may be configured or set for the sidelink resource pool. Furthermore, (the time length of) the DRX HARQ RTT time or timer (for sidelink) may be configured or set per sidelink resource pool. In addition, (the time length of) the DRX HARQ RTT time or timer (for sidelink) may not be configured or set per link.

In one embodiment, (the time length of) the DRX on-duration timer (for sidelink) may be different or separated if the first device is configured or operated in network scheduling mode (e.g., mode 1), or may be the same from (the time length of) the DRX on-duration timer (for sidelink) if the first device is configured or operated in device selection mode (e.g., mode 2).

In one embodiment, (the time length of) the DRX Inactivity timer (for sidelink) may be different or separated if the first device is configured or operated in network scheduling mode (e.g., mode 1), or may be the same from (the time length of) the DRX Inactivity timer (for sidelink) if the first device is configured/operated in device selection mode (e.g., mode 2).

In one embodiment, (the time length of) the DRX retransmission timer (for sidelink) may be different or separated if the first device is configured or operated in network scheduling mode (e.g., mode 1), or may be the same from (the time length of) the DRX retransmission timer (for sidelink) if the first device is configured or operated in device selection mode (e.g., mode 2).

In one embodiment, (the time length of) the DRX HARQ RTT time or timer (for sidelink) may be different or separated if the first device is configured or operated in network scheduling mode (e.g., mode 1), or may be the same from (the time length of) the DRX HARQ RTT time or timer (for sidelink) if the first device is configured or operated in device selection mode (e.g., mode 2).

In one embodiment, the first device may perform the sidelink resource (re-flection procedure for a sidelink transmission in a sidelink resource pool. The candidate sidelink resources in the set of the candidate slots may mean or may comprise all candidate sidelink resources in the set of the candidate slots in the sidelink resource pool. The sidelink resources in the valid sidelink resource set may be in the sidelink resource pool. The first sidelink resource may be in the sidelink resource pool.

Higher layer of the first device may indicate a specific number of sub-channels for the sidelink resource (re-)selection procedure. In one embodiment, each of the candidate sidelink resources in the set of the candidate slots may comprise the specific number of sub-channels. Each sidelink resource in the valid sidelink resource set may comprise the specific number of sub-channels. The first sidelink resource may comprise the specific number of sub-channels. The higher layer of the first device may mean MAC layer. The valid resource set may be delivered from physical layer to the higher layer. The valid resource set may mean or represent or may be replaced as identified resource set.

In one embodiment, the network node may be a gNB, a base station, a Roadside Unit (RSU), a network-type RSU, or a UE-type RSU. The network node may be replaced or represented by a specific device within a sidelink group.

In one embodiment, the data packet may be associated with at least a sidelink logical channel. The sidelink data may come from at least a sidelink logical channel. The sidelink transmission may be PSSCH and/or PSCCH. The PSCCH may deliver sidelink control information. The PSCCH may deliver 1st stage sidelink control information. The sidelink control information may comprise scheduling information of PSSCH transmission scheduled by the PSCCH.

In one embodiment, the slot may mean slot for sidelink or sidelink slot. A slot may be represented or replaced as a TTI. A TTI may be a subframe (for sidelink). A TTI may comprise multiple symbols, e.g. 12 or 14 symbols. The TTI may be a slot (fully or partially) comprising sidelink symbols. The TTI may mean a transmission time interval for a sidelink (data) transmission. A sidelink slot or a slot for sidelink may contain all Orthogonal Frequency Division Multiplexing (OFDM) symbols available for sidelink transmission. A sidelink slot or a slot for sidelink may contain a consecutive number symbols available for sidelink transmission. The symbol may mean a symbol indicated or configured for sidelink.

In one embodiment, the slots may mean or comprise the sidelink slots in the same sidelink resource pool. The set of the candidate slots may be in the same sidelink resource pool.

In one embodiment, a sub-channel is a unit for sidelink resource allocation or scheduling (for PSSCH). Furthermore, a sub-channel may comprise multiple contagious PRBs in frequency domain. The number of Physical Resource Blocks (PRBs) for each sub-channel may be (pre-)configured for a sidelink resource pool. A sidelink resource pool (pre-)configuration may indicate or configure the number of PRBs for each sub-channel. The number of PRBs for each sub-channel may be any of 10, 15, 20, 25, 50, 75, or 100. A sub-channel may be represented as a unit for sidelink resource allocation or scheduling.

In on embodiment, the SL HARQ feedback may be delivered via PSFCH. For PSCCH and/or PSSCH transmitted from transmitting device (e.g. the first device) to receiving device (e.g. the second device), the receiving device may transmit PSFCH for delivering SL HARQ feedback in response of detect or receiving PSCCH and/or PSSCH. The SL HARQ feedback may comprise ACK or NACK. The SL HARQ feedback for a data packet may be derived based on whether the receiving device successfully receives or decodes the data packet delivered in the associated PSSCH transmission. The SL HARQ feedback as DTX may mean the transmitting device may not detect or receive the PSFCH transmission or may detect neither ACK nor NACK.

In one embodiment, a data packet may mean a Transport Block (TB). A data packet may mean a MAC PDU. Furthermore, a data packet may mean one or two TB(s) delivered/included in one sidelink (re)transmission.

In one embodiment, the sidelink transmission or reception may be device-to-device transmission or reception. The sidelink transmission or reception may be V2X (e.g. V2V or V2P or V2I) transmission or reception, or P2X (e.g. P2V or P2P or P2I) transmission or reception. Furthermore, the sidelink transmission or reception may be on PC5 interface.

In one embodiment, the PC5 interface may be wireless interface for communication between device and device. The PC5 interface may also be wireless interface for communication between devices. Furthermore, the PC5 interface may be wireless interface for communication between UEs. In addition, the PC5 interface may be wireless interface for V2X or P2X communication. The Uu interface may be wireless interface for communication between network node and device, or for communication between network node and UE.

In one embodiment, the first device and the second device may be different devices. The first device may be a UE. In particular, the first device may be a vehicle UE, a pedestrian UE, or a V2X UE. The first device may also be a transmitting device. Furthermore, the first device may be a network-type RSU or a UE-type RSU.

In one embodiment, the second device may be a UE. In particular, the second device may be a vehicle UE, a pedestrian UE, or a V2X UE. The second device may also be a receiving device. Furthermore, the second device may be a network-type RSU or a UE-type RSU.

Figure 14:
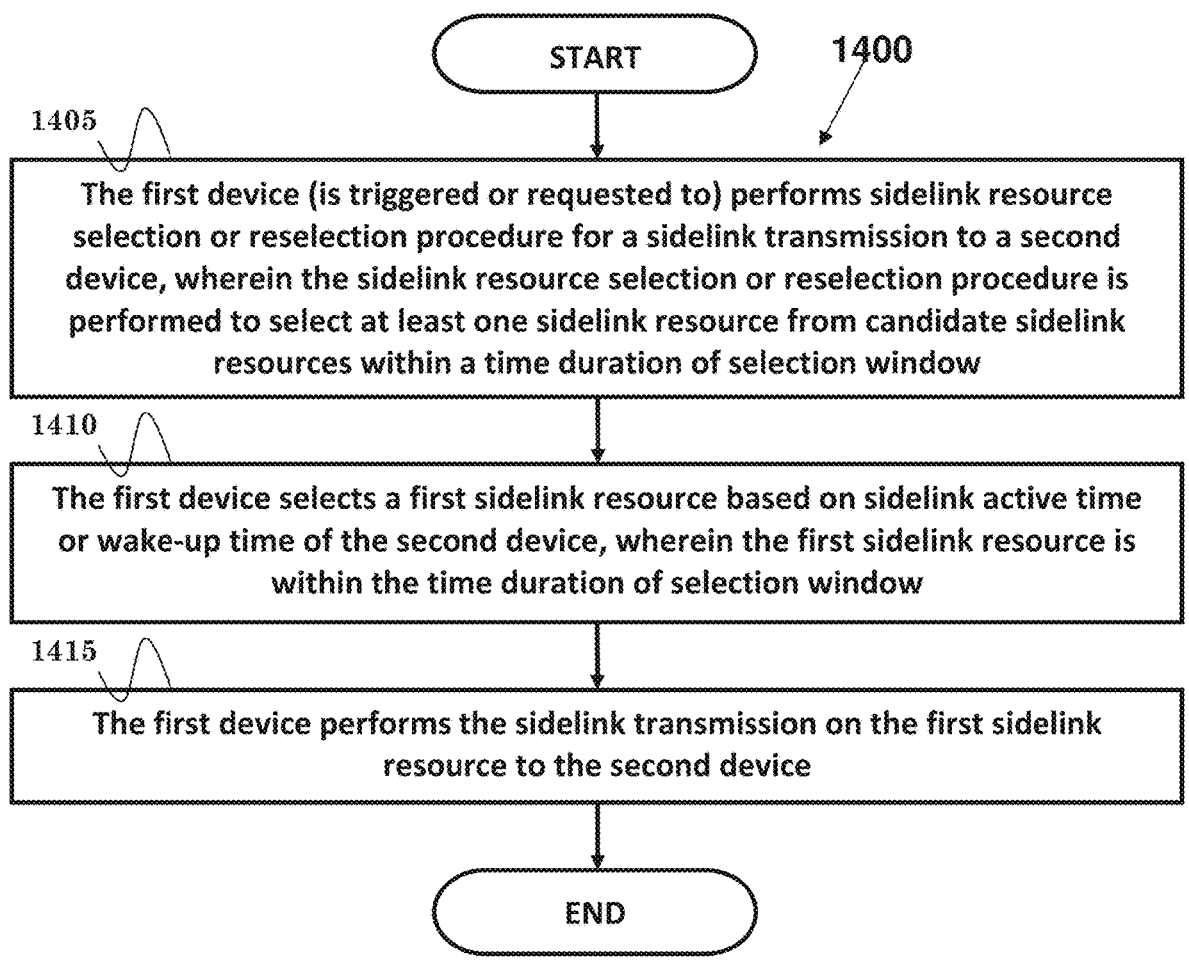
FIG. 14 is a flow chart according to one exemplary embodiment.

FIG. 14 is a flow chart 1400 according to one exemplary embodiment from the perspective of a first device to perform sidelink communication. In step 1405, the first device (is triggered or requested to) performs sidelink resource selection or reselection procedure for a sidelink transmission to a second device, wherein the sidelink resource selection or reselection procedure is performed to select at least one sidelink resource from candidate sidelink resources within a time duration of selection window. In step 1410, the first device selects a first sidelink resource based on sidelink active time or wake-up time of the second device, wherein the first sidelink resource is within the time duration of selection window. In step 1415, the first device performs the sidelink transmission on the first sidelink resource to the second device.

In one embodiment, the first sidelink resource may be selected or restricted to be within the sidelink active time or wake-up time of the second device. The first device may perform the sidelink resource selection or reselection procedure by deriving or determining a set of identified sidelink resources from the candidate sidelink resources, wherein candidate sidelink resources outside of the sidelink active time or wake-up time of the second device are excluded from being the identified sidelink resources. Furthermore, the first device may select the first sidelink resource from the set of identified sidelink resources.

In one embodiment, the first device may perform the sidelink resource selection or reselection procedure by deriving or determining a set of identified sidelink resources from the candidate sidelink resources. Furthermore, the first device may select the first sidelink resource from the set of identified sidelink resources, wherein (any) identified sidelink resources, in the set of identified sidelink resources, outside of the sidelink active time or wake-up time of the second device are excluded or precluded from selecting the first sidelink resource.

In one embodiment, the sidelink active time or wake-up time could be derived or determined based on sidelink Discontinuous Reception (DRX)-related parameters), or Physical Sidelink Control Channel (PSCCH)-monitoring-related parameters), or assisted parameters). The sidelink DRX-related parameters), PSCCH-monitoring-related parameters), or assisted parameters) comprises any of time length of sidelink DRX cycle, time length of sidelink DRX on-duration timer, sidelink DRX time offset, time length of sidelink DRX Inactivity timer, time length of sidelink DRX retransmission timer, and time length of sidelink DRX HARQ RTT timer.

In one embodiment, the first device may derive, determine, assume, or expect the sidelink active time or wake-up time of the second device, based on sidelink DRX-related parameters), PSCCH-monitoring-related parameters), or assisted parameters) of the second device.

In one embodiment, the candidate sidelink resources may be in a sidelink resource pool. The first device may derive, determine, assume, or expect the sidelink active time or wake-up time of the second device, based on sidelink DRX-related parameters), PSCCH-monitoring-related parameter(s), or assisted parameter(s) configured or set for the sidelink resource pool. Furthermore, the first device may derive, determine, assume, or expect the sidelink active time or wake-up time of the second device, based on sidelink DRX-related parameter(s), PSCCH-monitoring-related parameter(s), or assisted parameter(s) configured or set for sidelink connection or link between the first device and the second device.

In one embodiment, the first sidelink resource may be selected for an initial or new sidelink transmission for a TB.

The sidelink transmission on the first sidelink resource may be an initial or new sidelink transmission for a TB.

Referring back to FIGS. 3 and 4, in one exemplary embodiment of a first device to perform sidelink communication, wherein the first device (is triggered or requested to) performs sidelink resource selection or reselection procedure for a sidelink transmission to a second device, wherein the sidelink resource selection or reselection procedure is performed to select at least one sidelink resource from candidate sidelink resources within a time duration of selection window. The first device 300 includes a program code 312 stored in the memory 310. The CPU 308 could execute program code 312 to enable the first device (i) to select a first sidelink resource based on sidelink active time or wake-up time of the second device, wherein the first sidelink resource is within the time duration of selection window, and (ii) to perform the sidelink transmission on the first sidelink resource to the second device. Furthermore, the CPU 308 can execute the program code 312 to perform all of the above-described actions and steps or others described herein.

Figure 15:
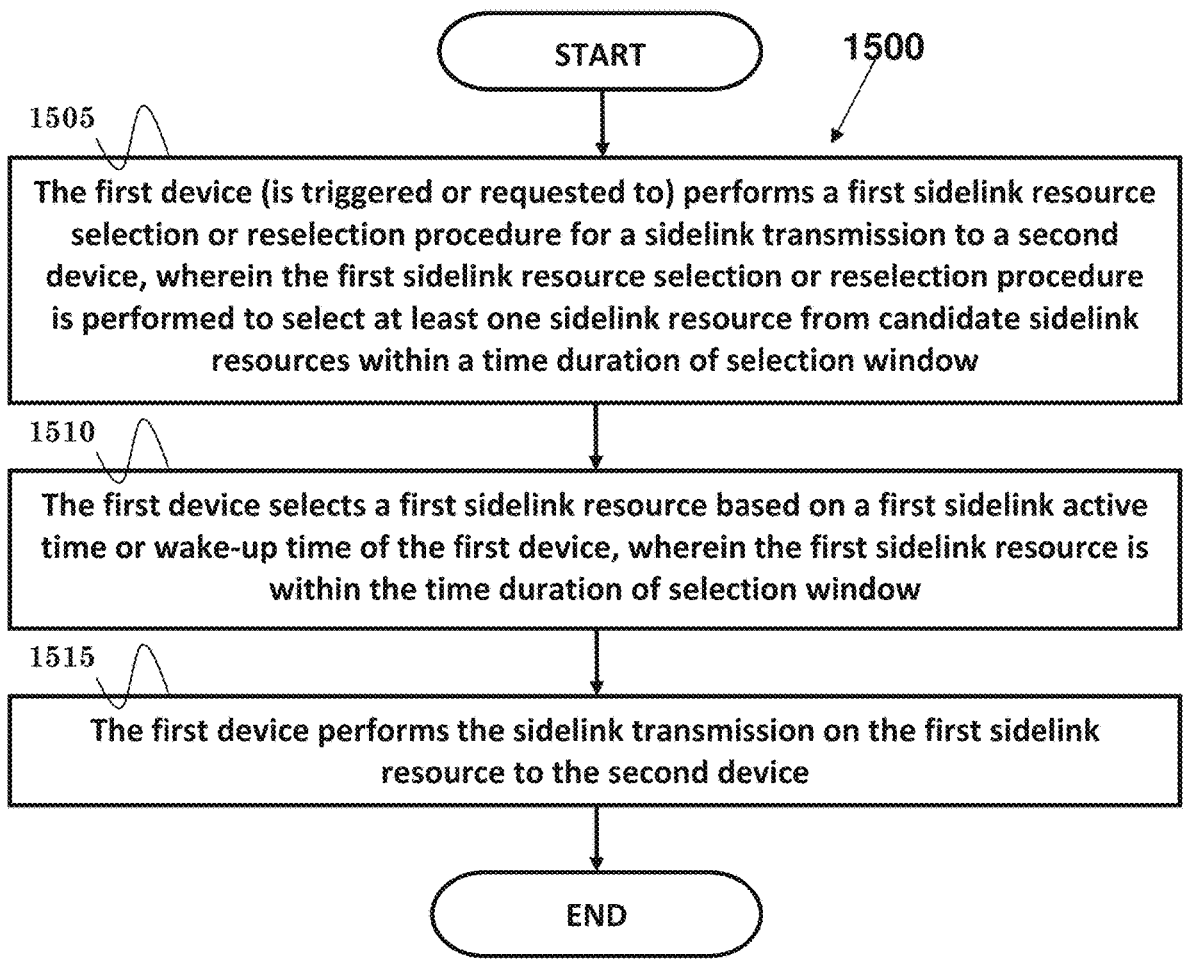
FIG. 15 is a flow chart according to one exemplary embodiment.

FIG. 15 is a flow chart 1500 according to one exemplary embodiment from the perspective of a first device to perform sidelink communication. In step 1505, the first device (is triggered or requested to) perform a first sidelink resource selection or reselection procedure for a sidelink transmission to a second device, wherein the first sidelink resource selection or reselection procedure is performed to select at least one sidelink resource from candidate sidelink resources within a time duration of selection window. In step 1510, the first device selects a first sidelink resource based on a first sidelink active time or wake-up time of the first device, wherein the first sidelink resource is within the time duration of selection window. In step 1515, the first device performs the sidelink transmission on the first sidelink resource to the second device.

In one embodiment, the first sidelink resource may be selected or restricted to be within the first sidelink active time or wake-up time of the first device. The first device may perform the first sidelink resource selection or reselection procedure by deriving or determining a set of identified sidelink resources from the candidate sidelink resources, wherein candidate sidelink resources outside of the first sidelink active time or wake-up time of the first device are excluded from being the identified sidelink resources. Furthermore, the first device selects the first sidelink resource from the set of identified sidelink resources.

In one embodiment, the first device may perform the first sidelink resource selection or reselection procedure by deriving or determining a set of identified sidelink resources from the candidate sidelink resources. Furthermore, the first device may select the first sidelink resource from the set of identified sidelink resources, wherein (any) identified sidelink resources, in the set of identified sidelink resources, outside of the first sidelink active time or wake-up time of the first device are excluded or precluded from selecting the first sidelink resource.

In one embodiment, the first sidelink active time or wake-up time may be derived or determined based on sidelink DRX-related parameters), PSCCH-monitoring-related parameter(s), or assisted parameters), wherein the sidelink DRX-related parameters), PSCCH-monitoring-related parameters), or assisted parameters) comprises any of time length of sidelink DRX cycle, time length of sidelink DRX on-duration timer, sidelink DRX time offset, time length of sidelink DRX Inactivity timer, time length of sidelink DRX retransmission timer, and time length of sidelink DRX HARQ RTT timer.

In one embodiment, the first device may derive or determine the first sidelink active time or wake-up time of the first device, based on sidelink DRX-related parameters), PSCCH-monitoring-related parameters), or assisted parameters) of the first device, wherein the first device shares, sets, or configures the same sidelink DRX-related parameters), PSCCH-monitoring-related parameters), or assisted parameters) with the second device.

In one embodiment, the candidate sidelink resources are in a sidelink resource pool, and the first device derives or determines the first sidelink active time or wake-up time of the first device, based on sidelink DRX-related parameters), PSCCH-monitoring-related parameter(s), or assisted parameters) configured or set for the sidelink resource pool.

In one embodiment, the first device derives or determines the first sidelink active time or wake-up time of the first device, based on sidelink DRX-related parameters), PSCCH-monitoring-related parameters), or assisted parameters) configured or set for sidelink connection or link between the first device and the second device.

In one embodiment, the first sidelink active time or wake-up time of the first device may be for sidelink connection or link between the first device and the second device.

In one embodiment, the first device may (be triggered or requested to) perform a second sidelink resource selection or reselection procedure for a sidelink transmission to a third device. Furthermore, the first device may select a second sidelink resource based on a second sidelink active time or wake-up time of the first device, wherein the second sidelink active time or wake-up time of the first device is for sidelink connection or link between the first device and the third device. In addition, the first device may perform the sidelink transmission on the second sidelink resource to the third device.

In one embodiment, the first sidelink resource may be selected for an initial or new sidelink transmission for a TB, and/or wherein the sidelink transmission on the first sidelink resource is the initial or new sidelink transmission for the TB.

Referring back to FIGS. 3 and 4, in one exemplary embodiment of a first device to perform sidelink communication, wherein the first device (is triggered or requested to) performs a first sidelink resource selection or reselection procedure for a sidelink transmission to a second device, wherein the first sidelink resource selection or reselection procedure is performed to select at least one sidelink resource from candidate sidelink resources within a time duration of selection window. The first device 300 includes a program code 312 stored in the memory 310. The CPU 308 could execute program code 312 to enable the first device (i) to select a first sidelink resource based on a first sidelink active time or wake-up time of the first device, wherein the first sidelink resource is within the time duration of selection window, and (ii) to perform the sidelink transmission on the first sidelink resource to the second device. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a first device to perform sidelink communication, comprising:
   the first device performs a sidelink resource selection or reselection procedure for a sidelink transmission to a second device, wherein the sidelink resource selection or reselection procedure is performed to derive or determine a set of identified sidelink resources from candidate sidelink resources within a time duration of selection window and to select a first sidelink resource from the set of identified sidelink resources based on sidelink active time or wake-up time of the second device,
   wherein the first sidelink resource is within the time duration of selection window, and
   wherein at least one of:
      candidate sidelink resources outside of the sidelink active time or wake-up time of the second device are excluded or precluded from being derived or determined among the set of identified sidelink resources; or
      identified sidelink resources outside of the sidelink active time or wake-up time of the second device are excluded or precluded from being selected as the first sidelink resource; and the first device performs the sidelink transmission on the first sidelink resource to the second device.

2. The method of claim 1, wherein the first sidelink resource is selected or restricted to be within the sidelink active time or wake-up time of the second device.

3. The method of claim 1, at least one of:
wherein the sidelink active time or wake-up time is derived or determined based on sidelink Discontinuous Reception (DRX)-related parameter(s), or Physical Sidelink Control Channel (PSCCH)-monitoring-related parameter(s), or assisted parameter(s); or
wherein the sidelink DRX-related parameter(s), PSCCH-monitoring-related parameter(s), or assisted parameter(s) comprises at least one of time length of sidelink DRX cycle, time length of sidelink DRX on-duration timer, sidelink DRX time offset, time length of sidelink DRX Inactivity timer, time length of sidelink DRX retransmission timer, and time length of sidelink DRX Hybrid Automatic Repeat Request (HARQ) Round Trip Time (RTT) timer.

4. The method of claim 1, further comprising:
the first device derives, determines, assumes, or expects the sidelink active time or wake-up time of the second device, based on sidelink Discontinuous Reception (DRX)-related parameter(s), Physical Sidelink Control Channel (PSCCH)-monitoring-related parameter(s), or assisted parameter(s) of the second device.

5. The method of claim 1, wherein the candidate sidelink resources are in a sidelink resource pool, and
the first device derives, determines, assumes, or expects the sidelink active time or wake-up time of the second device, based on sidelink Discontinuous Reception (DRX)-related parameter(s), Physical Sidelink Control Channel (PSCCH)-monitoring-related parameter(s), or assisted parameter(s) configured or set for the sidelink resource pool.

6. The method of claim 1, further comprising:
the first device derives, determines, assumes, or expects the sidelink active time or wake-up time of the second device, based on sidelink Discontinuous Reception (DRX)-related parameter(s), Physical Sidelink Control Channel (PSCCH)-monitoring-related parameter(s), or assisted parameter(s) configured or set for sidelink connection or link between the first device and the second device.

7. The method of claim 1, at least one of:
wherein the first sidelink resource is selected for an initial or new sidelink transmission for a Transport Block (TB); or,
wherein the sidelink transmission on the first sidelink resource is the initial or new sidelink transmission for the TB.

8. A method of a first device to perform sidelink communication, comprising:
the first device performs a first sidelink resource selection or reselection procedure for a sidelink transmission to a second device, wherein the first sidelink resource selection or reselection procedure is performed to derive or determine a set of identified sidelink resources from candidate sidelink resources within a time duration of selection window and to select a first sidelink resource from the set of identified sidelink resources based on a first sidelink active time or wake-up time of the first device,
wherein the first sidelink resource is within the time duration of selection window; and
wherein at least one of:
candidate sidelink resources outside of the first sidelink active time or wake-up time of the first device are excluded or precluded from being derived or determined among the set of identified sidelink resources; or
identified sidelink resources outside of the first sidelink active time or wake-up time of the first device are excluded or precluded from being selected as the first sidelink resource; and
the first device performs the sidelink transmission on the first sidelink resource to the second device.

9. The method of claim 8, wherein the first sidelink resource is selected or restricted to be within the first sidelink active time or wake-up time of the first device.

10. The method of claim 8, at least one of:
wherein the first sidelink active time or wake-up time is derived or determined based on sidelink Discontinuous Reception (DRX)-related parameter(s), Physical Sidelink Control Channel (PSCCH)-monitoring-related parameter(s), or assisted parameter(s); or
wherein the sidelink Discontinuous Reception (DRX)-related parameter(s), Physical Sidelink Control Channel (PSCCH)-monitoring-related parameter(s), or assisted parameter(s) comprises at least one of time length of sidelink DRX cycle, time length of sidelink DRX on-duration timer, sidelink DRX time offset, time length of sidelink DRX Inactivity timer, time length of sidelink DRX retransmission timer, and time length of sidelink DRX Hybrid Automatic Repeat Request (HARQ) Round Trip Time (RTT) timer.

11. The method of claim 8, further comprising at least one of:
the first device derives or determines the first sidelink active time or wake-up time of the first device, based on sidelink Discontinuous Reception (DRX)-related parameter(s), Physical Sidelink Control Channel (PSCCH)-monitoring-related parameter(s), or assisted parameter(s) of the first device; or
wherein the first device shares, sets, or configures the same sidelink DRX-related parameter(s), PSCCH-monitoring-related parameter(s), or assisted parameter(s) with the second device.

12. The method of claim 8, wherein the candidate sidelink resources are in a sidelink resource pool, and the first device derives or determines the first sidelink active time or wake-up time of the first device, based on sidelink Discontinuous Reception (DRX)-related parameter(s), Physical Sidelink Control Channel (PSCCH)-monitoring-related parameter(s), or assisted parameter(s) configured or set for the sidelink resource pool.

13. The method of claim 8, further comprising:
the first device derives or determines the first sidelink active time or wake-up time of the first device, based on sidelink Discontinuous Reception (DRX)-related parameter(s), Physical Sidelink Control Channel (PSCCH)-monitoring-related parameter(s), or assisted parameter(s) configured or set for sidelink connection or link between the first device and the second device, wherein the first sidelink active time or wake-up time of the first device is for sidelink connection or link between the first device and the second device.

14. The method of claim 8, wherein the first device performs a second sidelink resource selection or reselection procedure for a sidelink transmission to a third device;
the first device selects a second sidelink resource based on a second sidelink active time or wake-up time of the first device, wherein the second sidelink active time or wake-up time of the first device is for sidelink connection or link between the first device and the third device; and the first device performs the sidelink transmission on the second sidelink resource to the third device.

15. The method of claim 8, at least one of:
wherein the first sidelink resource is selected for an initial or new sidelink transmission for a Transport Block (TB); or
wherein the sidelink transmission on the first sidelink resource is the initial or new sidelink transmission for the TB.

16. A first device, comprising:
a control circuit;
a processor installed in the control circuit; and
a memory installed in the control circuit and operatively coupled to the processor;
wherein the processor is configured to execute a program code stored in the memory to:
perform a sidelink resource selection or reselection procedure for a sidelink transmission to a second device, wherein the sidelink resource selection or reselection procedure is performed to derive or determine a set of identified sidelink resources from candidate sidelink resources within a time duration of selection window and to select a first sidelink resource from the set of identified sidelink resources based on sidelink active time or wake-up time of the second device,
wherein the first sidelink resource is within the time duration of selection window, and
wherein at least one of:
candidate sidelink resources outside of the sidelink active time or wake-up time of the second device are excluded or precluded from being derived or determined among the set of identified sidelink resources; or
identified sidelink resources outside of the sidelink active time or wake-up time of the second device are excluded or precluded from being selected as the first sidelink resource; and
perform the sidelink transmission on the first sidelink resource to the second device.

* * * * *